United States Patent
Hirakawa

(10) Patent No.: US 10,853,919 B2
(45) Date of Patent: Dec. 1, 2020

(54) IMAGE PROCESSING APPARATUS, IMAGE PROCESSING METHOD, AND PROGRAM

(71) Applicant: Sony Corporation, Tokyo (JP)

(72) Inventor: Seigou Hirakawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 106 days.

(21) Appl. No.: 16/091,328

(22) PCT Filed: Feb. 28, 2017

(86) PCT No.: PCT/JP2017/007639
§ 371 (c)(1),
(2) Date: Oct. 4, 2018

(87) PCT Pub. No.: WO2017/208540
PCT Pub. Date: Dec. 7, 2017

(65) Prior Publication Data
US 2019/0156463 A1    May 23, 2019

(30) Foreign Application Priority Data

May 30, 2016 (JP) ................. 2016-106928

(51) Int. Cl.
| | |
|---|---|
| *G06T 5/00* | (2006.01) |
| *G06T 1/60* | (2006.01) |
| *G06T 3/40* | (2006.01) |
| *G06T 7/70* | (2017.01) |
| *H04N 1/393* | (2006.01) |

(52) U.S. Cl.
CPC ............. *G06T 5/002* (2013.01); *G06T 1/60* (2013.01); *G06T 3/4007* (2013.01); *G06T 7/70* (2017.01); *H04N 1/393* (2013.01)

(58) Field of Classification Search
None
See application file for complete search history.

(56) References Cited

U.S. PATENT DOCUMENTS 6,028,589 A * 2/2000 Mehra ............... G09G 3/3685
345/603
6,331,902 B1 * 12/2001 Lin ...................... G06T 3/4015
358/1.9

(Continued)

FOREIGN PATENT DOCUMENTS

| JP | 2007-279780 A | 10/2007 |
| JP | 2007279780 A | * 10/2007 |
| JP | 2012-226608 A | 11/2012 |

*Primary Examiner* — Andrae S Allison
(74) *Attorney, Agent, or Firm* — Michael Best & Friedrich LLP

(57) ABSTRACT

An image processing apparatus having a memory for holding an image aims to improve an image processing speed. The image processing apparatus includes a writing unit, a reading unit, and a reduction unit. The writing unit writes a predetermined number of pieces of pixel data arranged in a predetermined direction in image data in which the pixel data is arranged in a two-dimensional lattice pattern to be distributed over the plurality of memories. The reading unit reads a predetermined number of pieces of pixel data from the plurality of memories. The reduction unit executes processing of smoothing in a predetermined direction onto the read pixel data.

16 Claims, 23 Drawing Sheets

(56) References Cited

U.S. PATENT DOCUMENTS

| | | | | |
|---|---|---|---|---|
| 7,920,150 B2* | 4/2011 | Ku | ............................ | G06T 3/40 |
| | | | | 345/660 |
| 9,386,234 B2* | 7/2016 | Mills | .................... | H04N 5/2628 |
| 10,152,766 B2* | 12/2018 | Kim | ........................... | G06T 1/60 |
| 2003/0128896 A1* | 7/2003 | Nacman | ................ | G06T 3/4007 |
| | | | | 382/300 |
| 2004/0201863 A1* | 10/2004 | Bailey | ................... | G06T 3/4023 |
| | | | | 358/1.2 |
| 2009/0168885 A1* | 7/2009 | Peng | ...................... | H04N 19/51 |
| | | | | 375/240.16 |
| 2010/0074559 A1* | 3/2010 | Satou | ........................ | G06T 1/60 |
| | | | | 382/300 |
| 2012/0182321 A1* | 7/2012 | Kondo | ................... | H04N 5/765 |
| | | | | 345/660 |

* cited by examiner

FIG. 13
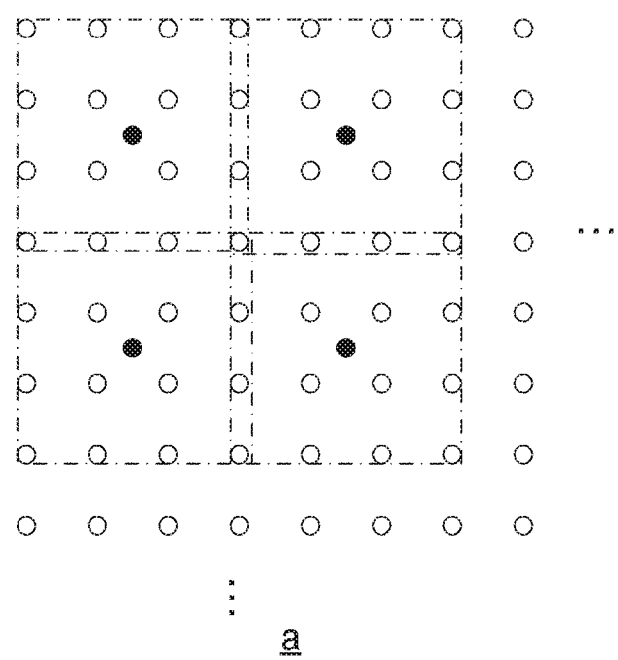
a
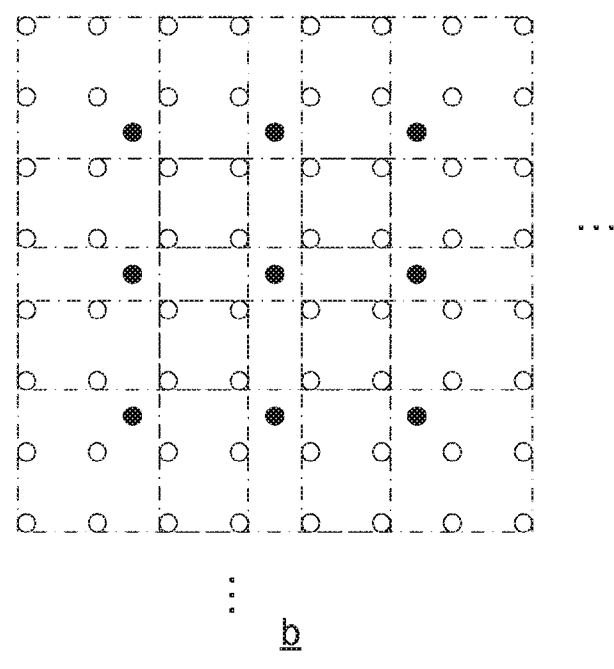
b

FIG. 15
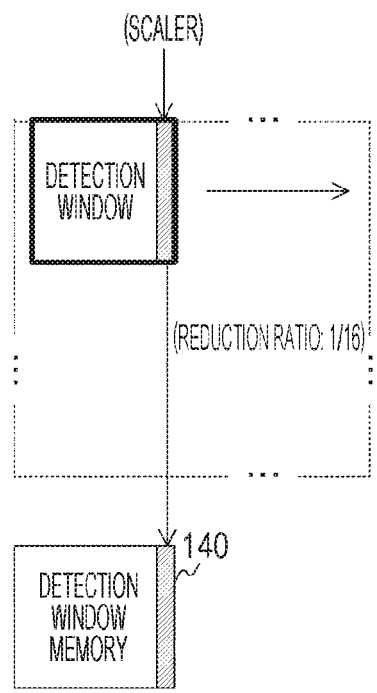
a
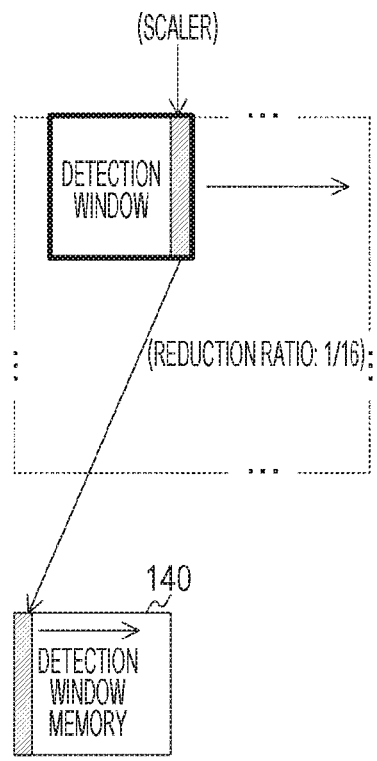
b

IMAGE PROCESSING APPARATUS, IMAGE PROCESSING METHOD, AND PROGRAM

TECHNICAL FIELD

The present technology relates to an image processing apparatus, an image processing method, and a program. Specifically, the present technology relates to an image processing apparatus including a memory for holding images, an image processing method, and a program for causing a computer to execute the method.

BACKGROUND ART

Conventionally, an image recognition technology for recognizing and detecting an object such as facial or other human figures in an image has been used in a wide range of fields such as crime prevention, personal verification, and transportation. For example, there is a proposed image processing apparatus provided for the purpose of detecting objects of various sizes and that generates a plurality of reduced images of different sizes from an original image and moves a detection window of a fixed size in these reduced images to detect the object (for example, see Patent Document 1).

CITATION LIST

Patent Document

Patent Document 1: Japanese Patent Application Laid-Open No. 2012-226608

SUMMARY OF THE INVENTION

Problems to be Solved by the Invention

In the above-described conventional technique, an original image is held in a frame memory, and the original image is read from the frame memory to generate a reduced image. However, the larger the data amount of the original image, the longer the time taken for completion of image reading, causing a problem of lowering image processing speed.

The present technology has been developed in view of such a situation, and aims to improve image processing speed in an image processing apparatus having a memory for holding an image.

Solutions to Problems

The present technology aims to solve the above problem and according to a first aspect of the present technology, there is provided an image processing apparatus including: a plurality of memories; a writing unit that writes a predetermined number of pieces of pixel data arranged in a predetermined direction in image data in which the pixel data is arranged in a two-dimensional lattice pattern to be distributed over the plurality of memories; a reading unit that reads the predetermined number of pieces of pixel data from the plurality of memories; and a reduction unit that performs processing of smoothing in the predetermined direction onto the read pixel data, an image processing method, and a program for causing a computer to execute the method. With this configuration, it is possible to achieve an effect that smoothing processing is executed on the pixel data read from the plurality of memories.

In addition, in the first aspect, the reduction unit may include: a smoothing processing unit that executes processing of smoothing in the predetermined direction onto the read pixel data and outputs a processing result; and an interpolation unit that generates new pixel data as interpolation pixel data on the basis of the processing result. With this configuration, it is possible to achieve an effect that interpolation pixel data is generated.

Furthermore, it is allowable in the first aspect to further include: a rectangular region holding unit that holds a rectangular region in which a predetermined number of pieces of the interpolation pixel data are arranged in a two-dimensional lattice pattern; and a detector that detects a predetermined object in the rectangular region. With this configuration, it is possible to achieve an effect that an object is detected in the rectangular region.

In addition, it is allowable in the first aspect to further include a write back processing unit that writes back reduced image data in which all the interpolation pixel data generated from the image data are arranged in a two-dimensional lattice pattern to be distributed over the plurality of memories, in which the reading unit may further read the predetermined number of pieces of interpolation pixel data from the plurality of memories, and the reduction unit may further execute processing of smoothing in the predetermined direction onto the read interpolation pixel data. With this configuration, it is possible to achieve an effect that the reduced image data is written back.

Furthermore, it is allowable in the first aspect to further include a control unit that sequentially sets a plurality of reduction ratios and provides the reduction unit with an address of the interpolation pixel data to be output in the reduced image data corresponding to the set reduction ratio, and the reading unit may read the pixel data of the predetermined number of addresses corresponding to the provided address. With this configuration, it is possible to achieve an effect that a predetermined number of pixel data corresponding to the interpolation pixel data is read.

Furthermore, in the first aspect, it is allowable to have a configuration in which two regions are provided in each of the plurality of memories, the writing unit alternately executes processing of writing the pixel data into one of the two regions and processing of writing the pixel data into the other of the two regions, and the reading unit alternately executes processing of reading the pixel data from the other region while the pixel data is written into the one region and processing of reading the pixel data from the one region while the pixel data is written into the other region. With this configuration, it is possible to achieve an effect that pixel data is read from one region of the two regions while pixel data is written into the other region.

Furthermore, in the first aspect, the reduction unit may perform processing of smoothing in the predetermined direction and processing of smoothing in a direction perpendicular to the predetermined direction. With this configuration, it is possible to achieve an effect of executing the processing of smoothing in the predetermined direction and the processing of smoothing in the direction perpendicular to the predetermined direction.

Furthermore, in the first aspect, the reading unit may simultaneously read the predetermined number of pieces of pixel data. With this configuration, it is possible to achieve an effect that a predetermined number of pieces of pixel data is read simultaneously.

Effects of the Invention

According to the present technology, it is possible to achieve an excellent effect that the image processing speed can be improved in an image processing apparatus including a memory that holds an image. Note that effects described herein are non-restricting. The effects may be any effects described in the present disclosure.

BRIEF DESCRIPTION OF DRAWINGS

FIG. 13 is a diagram illustrating an example of pixel data in an image before and after reduction when the reduction ratios are 1/9 and 1/4 according to the first embodiment of the present technology.

FIG. 15 is a diagram illustrating a method of moving a detection window according to the first embodiment of the present technology.

MODE FOR CARRYING OUT THE INVENTION

Hereinafter, embodiments of the present technology (hereinafter, embodiment(s)) will be described. The description will be given in the following order.

1. First embodiment (example of writing images to be distributed over a plurality of memories)
2. Second embodiment (example of writing back the reduced image after writing the image to be distributed over a plurality of memories)
3. Third embodiment (example of writing images to be distributed over a plurality of memories divided into an odd number region and an even number region)

1. First Embodiment

Configuration Example of Image Processing Apparatus

Figure 1:
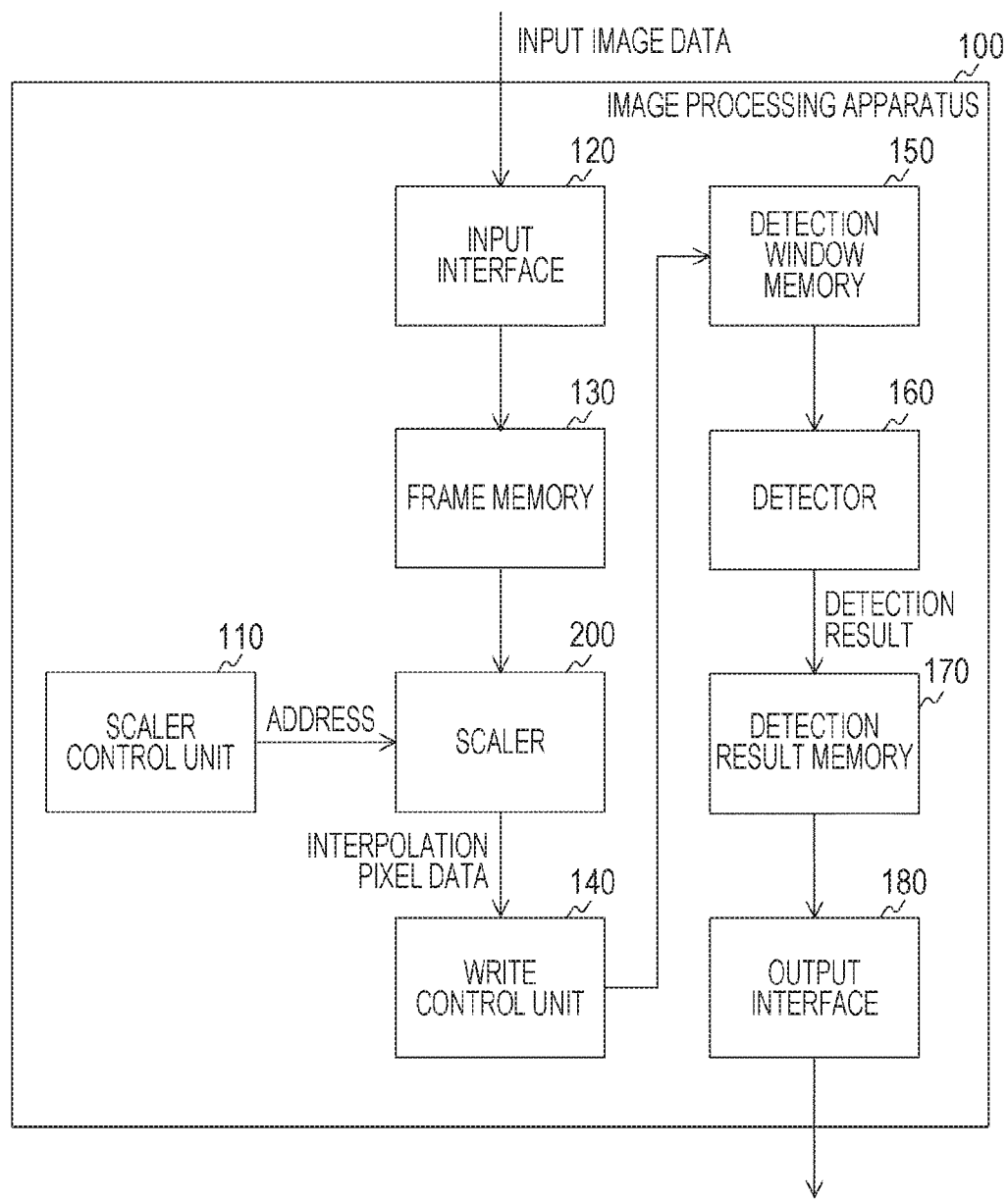
FIG. 1 is a block diagram illustrating a configuration example of an image processing apparatus according to a first embodiment of the present technology.

FIG. 1 is a block diagram illustrating a configuration example of an image processing apparatus 100 according to a first embodiment. The image processing apparatus 100 processes input image data to detect a predetermined object. For example, a camera, a smartphone, or a personal computer is assumed as the image processing apparatus 100. The image processing apparatus 100 includes a scaler control unit 110, an input interface 120, a frame memory 130, and a scaler 200. Furthermore, the image processing apparatus 100 includes a write control unit 140, a detection window memory 150, a detector 160, a detection result memory 170, and an output interface 180.

The input interface 120 obtains input image data input into the image processing apparatus 100. For example, image data generated by a source device or an imaging element is input into the image processing apparatus 100 as input image data. The input image data includes pixel data arranged in a two-dimensional lattice pattern. The input interface 120 divides and writes the input image data into the frame memory 130. Details of the method of dividing the input image data will be described below. The frame memory 130 holds input image data (frames). Note that the input interface 120 is an example of a writing unit described in the claims.

The scaler control unit 110 controls the scaler 200. The scaler control unit 110 sequentially sets a plurality of mutually different reduction ratios. Then, the scaler control unit 110 sequentially provides addresses of the pixel data to be interpolated in the input image data to the scaler 200 on the basis of the set reduction ratio. For example, in a case where the input image data is to be reduced to 1/4 in the horizontal direction, 1.5 rows in the middle of 0 to 3 rows of pixels are interpolated, then 5.5 rows in the middle of 4 to 7 rows are interpolated. Note that the scaler control unit 110 is an example of a control unit described in the claims.

The scaler 200 reduces image data. The scaler 200 simultaneously reads from the frame memory 130 a plurality of pieces of pixel data corresponding to the address provided from the scaler control unit 110. Then, the scaler 200 generates new pixel data as interpolation pixel data from the read pixel data, and supplies the new pixel data to the write control unit 140. Note that the scaler 200 is an example of a reduction unit described in the claims.

The write control unit 140 writes the interpolation pixel data into the detection window memory 150. The detection window memory 150 holds, as a detection window, a rectangular region in which interpolation pixel data are arranged in a two-dimensional lattice pattern. Note that the detection window memory 150 is an example of a rectangular region holding unit described in the claims.

The detector 160 detects a specific object (face, person, or the like) in the detection window. Detection of an object uses a method of extracting feature quantities of a detection window and matching the data with previously learned data, a template matching method, or the like. The detector 160 causes the detection result memory 170 to hold a detection result indicating the presence or absence of an object for each of detected positions.

The detection result memory 170 holds the detection result. The output interface 180 reads the detection result from the detection result memory 170 and outputs it to the outside.

Figure 2:
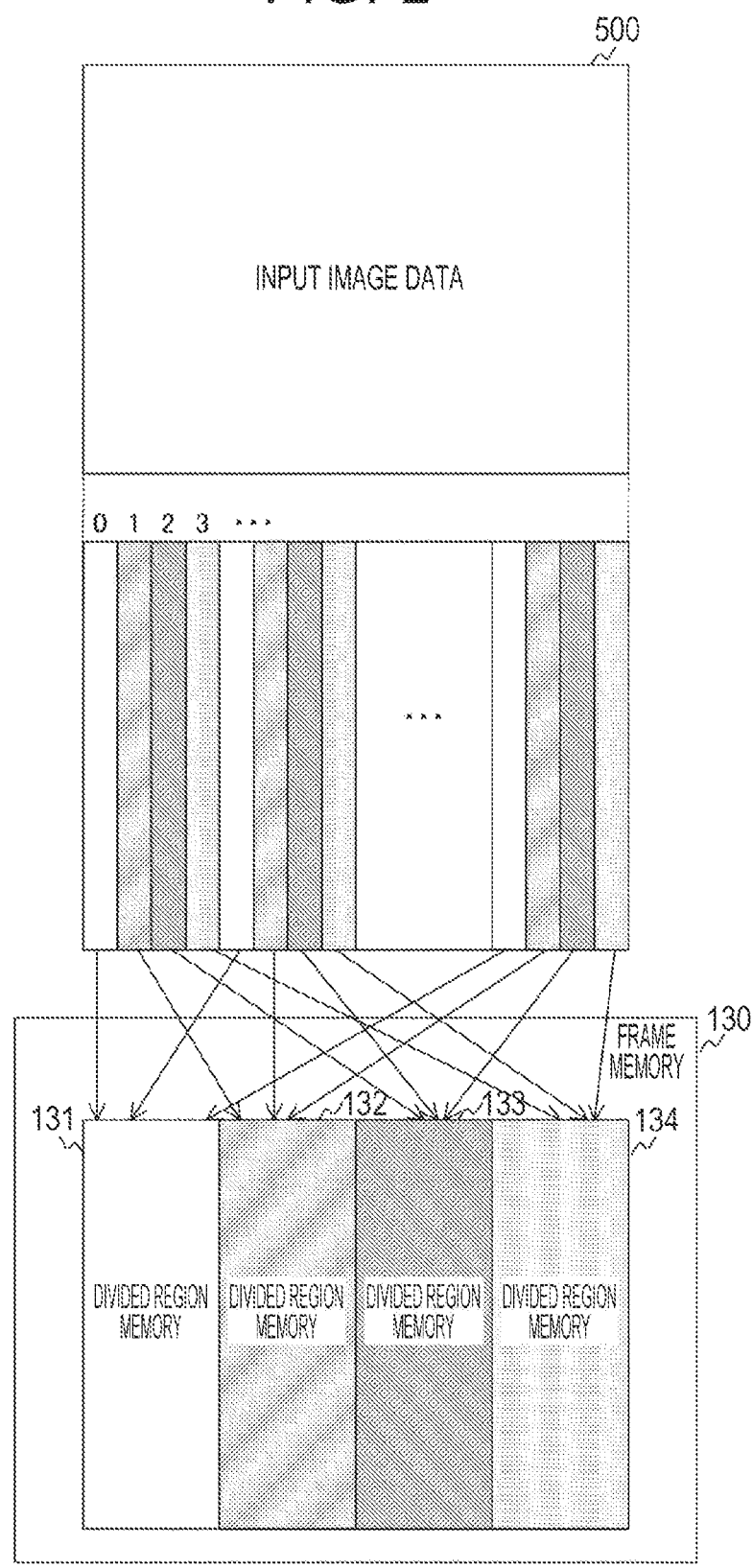
FIG. 2 is a diagram illustrating a writing method to a frame memory in the first embodiment of the present technology.

FIG. 2 is a diagram illustrating a writing method to the frame memory in the first embodiment. The frame memory 130 includes four memories, namely, divided region memories 131 to 134. Note that the divided region memories 131 to 134 are examples of memories described in the claims.

Hereinafter, a set of pixel data arranged in the horizontal direction in the input image data will be referred to as "row", and a set of pixel data arranged in the vertical direction will be referred to as "column". Rows are sequentially input into the input interface 120, and intra-row pixel data is sequentially input in each of the rows. For example, rows are sequentially input in the direction from the upper end to the lower end, and pixel data is sequentially input in a direction from the left end to the right end in each of the rows.

The input interface 120 writes four pieces of pixel data arranged in the horizontal direction to be distributed over the divided region memories 131 to 134. For example, the input interface 120 writes (4n)th (n is an integer) input pixel data to the divided region memory 131, and writes the (4n+1)th input pixel data to the divided region memory 132. In addition, the input interface 120 writes the (4n+2)th input pixel data to the divided region memory 133, and writes the (4n+3)th input pixel data to the divided region memory 134. With this configuration, (4n)th columns such as the zeroth and the fourth column are held in the divided region memory 131. Similarly, (4n+1)th columns such as the first column and the fifth column are held in the divided region memory 132.

Hereinafter, the set of pixel data held in each of the divided region memories 131 to 134 will be referred to as "divided region".

Note that while the above is an example in which the input interface 120 writes the four pieces of pixel data arranged in the horizontal direction to be distributed, it is also allowable to write the four pieces of pixel data arranged in the vertical direction to be distributed. Moreover, while the input interface 120 writes the four pieces of pixel data to be distributed over the four memories (131 to 134), it is also allowable to distribute a plurality of pieces of pixel data other than four. For example, the input interface 120 may write two pieces of pixel data to be distributed over two memories, or write eight pieces of pixel data to be distributed over eight memories.

In addition, while the number of pieces of pixel data to be distributed and the number of memories are both four in this example, the numbers may be different from each other. For example, the input interface 120 may divide eight pieces of pixel data into two groups each including four pieces and write the four pieces of data into each of the two memories.

Configuration Example of Input Interface

Figure 3:
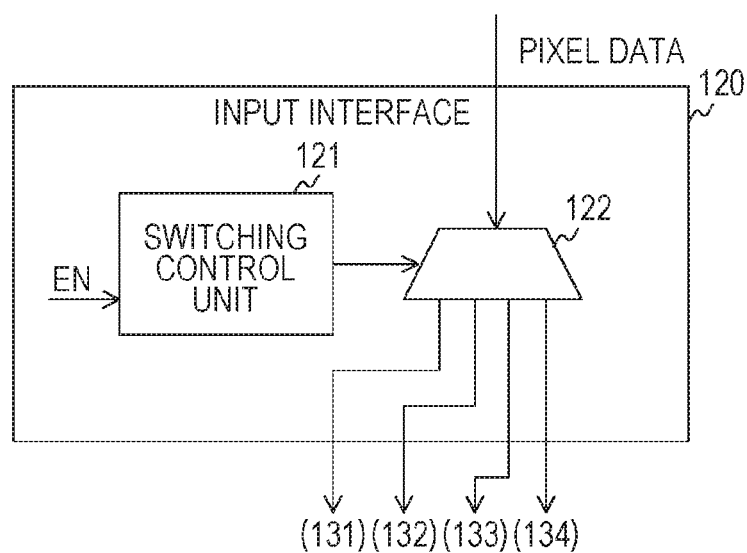
FIG. 3 is a block diagram illustrating a configuration example of an input interface in the first embodiment of the present technology.

FIG. 3 is a block diagram illustrating a configuration example of the input interface 120 in the first embodiment. The input interface 120 includes a switching control unit 121 and a selector 122.

The switching control unit 121 changes an output destination of the selector 122 in synchronization with a pixel enable signal EN. Here, the pixel enable signal EN is a signal indicating the timing at which the pixel data is input. The selector 122 selects any of the divided region memories 131 to 134 and outputs the pixel data to the selected memory. The switching control unit 121 outputs the pixel enable signal EN to the divided region memory 131 when the pixel enable signal EN rises at the (4n)th time, and outputs the pixel enable signal EN to the divided region memory 132 when the pixel enable signal EN rises at the (4n+1)th time. In addition, the switching control unit 121 outputs the pixel enable signal EN to the divided region memory 133 when the pixel enable signal EN rises at the (4n+2)th time, and outputs the pixel enable signal EN to the divided region memory 134 when the pixel enable signal EN rises at the (4n+3)th time.

Scaler Configuration Example

Figure 4:
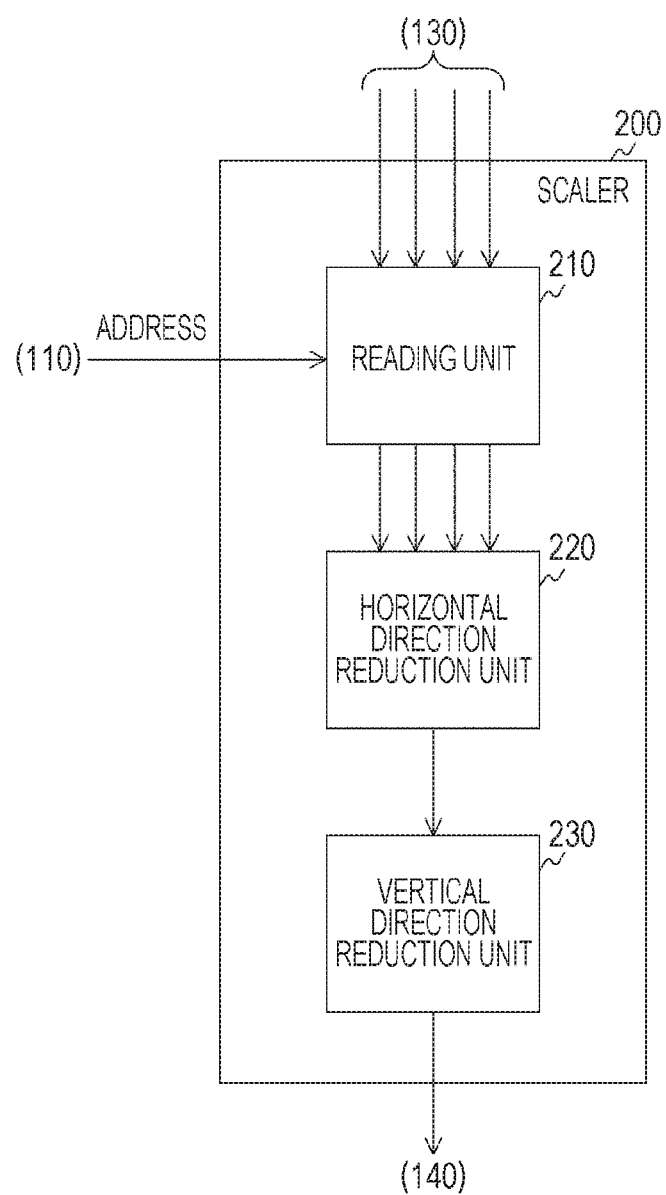
FIG. 4 is a block diagram illustrating a configuration example of a scaler according to the first embodiment of the present technology.

FIG. 4 is a block diagram illustrating a configuration example of the scaler 200 according to the first embodiment. The scaler 200 includes a reading unit 210, a horizontal direction reduction unit 220, and a vertical direction reduction unit 230.

The reading unit 210 simultaneously reads each of the four pieces of pixel data corresponding to the address provided from the scaler control unit 110, from each of the divided region memories 131 to 134. For example, when "1.5" is provided as an address of a column to be interpolated by the scaler control unit 110, the reading unit 210 simultaneously reads four pieces of pixel data of 0 to 3 columns in the vicinity of the column.

Here, the zeroth column from the left end of the input image data is held in the zeroth column from the left end within the divided region memory 131, while the first column from the left end of the input image data is held in the zeroth column from the left end within the divided region memory 132. Moreover, the second column from the left end of the input image data is held in the zeroth column from the left end within the divided region memory 133, while the third column from the left end of the input image data is held in the zeroth column from the left end within the divided region memory 134. Therefore, when the 15th column is provided, the reading unit 210 may read the zeroth column of each of the divided region memories 131 to 134.

Hereinafter, it is assumed that the address of the input image data in the horizontal direction (that is, the column address) is defined as i (i is a real number of 0 or more) and the address in the vertical direction (that is, the row address) as j (j is a real number of 0 or more). Furthermore, an identification number for identifying the divided region memories 131 to 134 is defined as m (m is 0 to 3). When the address (i, j) is provided, the reading unit 210 reads the pixel data from the address (k, j) of each of the divided region memories 131 to 134. This k is a relative address in the horizontal direction and is expressed by the following formula.

$$k=\text{int}\{(i+2-m)/4\}$$

In the above formula, int ( ) is a function that truncates a fraction and returns an integer part.

Furthermore, the reading unit 210 aligns the four pieces of pixel data. For example, the reading unit 210 calculates r using the following formula, aligns the pixel data in descending order of r from the left end to the right end, and supplies the aligned data to the horizontal direction reduction unit 220.

$$r=\text{mod}\{(i+2-m)/4\}$$

In the above formula, mod ( ) is a function that returns the remainder obtained by dividing the numerator by the denominator.

Note that, while the reading unit 210 simultaneously reads four pieces of pixel data, a portion of the data may be simultaneously read. For example, the reading unit 210 may perform processing of simultaneously reading two pieces of pixel data twice to obtain four pieces of pixel data.

The horizontal direction reduction unit 220 performs smoothing processing and interpolation processing in the horizontal direction. With this two types of processing, the image data is reduced in the horizontal direction. The horizontal direction reduction unit 220 supplies the interpolation pixel data generated by the interpolation processing to the vertical direction reduction unit 230.

The vertical direction reduction unit 230 performs smoothing processing and interpolation processing in the vertical direction. With this two types of processing, the image data is reduced in the vertical direction. The vertical direction reduction unit 230 supplies the interpolation pixel data to the write control unit 140. Note that the horizontal direction reduction unit 220 and the vertical direction reduction unit 230 are examples of a reduction unit described in the claims.

Note that while the scaler 200 reduces the image data in the vertical direction and the vertical direction, the scaler 200 may perform reduction in one of the directions.

Configuration Example of Horizontal Direction Reduction Unit

Figure 5:
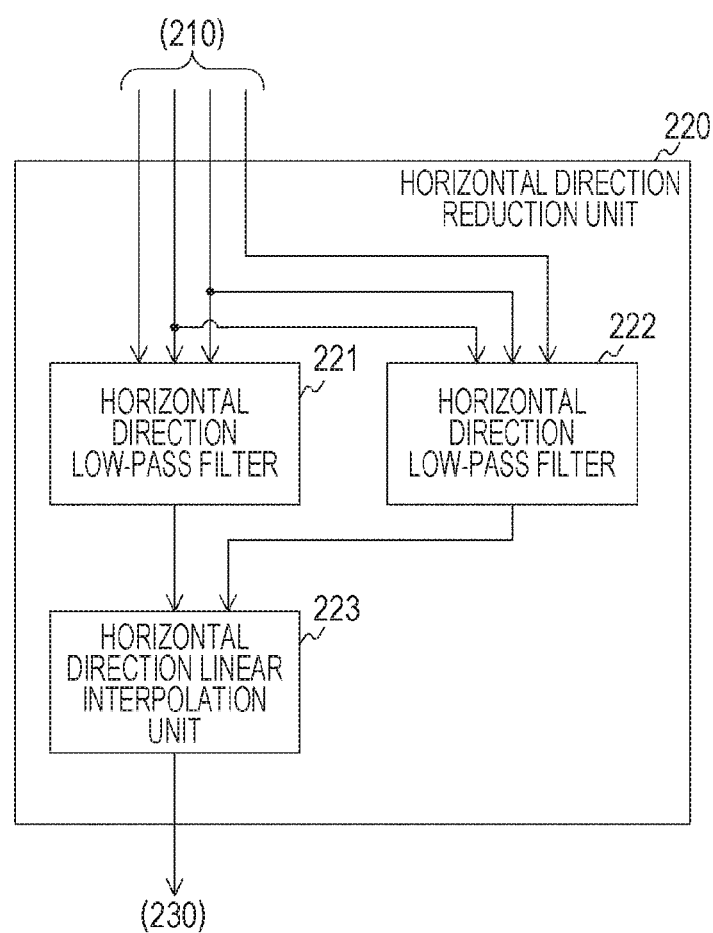
FIG. 5 is a block diagram illustrating a configuration example of a horizontal direction reduction unit according to the first embodiment of the present technology.

FIG. 5 is a block diagram illustrating a configuration example of the horizontal direction reduction unit 220 in the first embodiment. The horizontal direction reduction unit 220 includes horizontal direction low-pass filters 221 and 222 and a horizontal direction linear interpolation unit 223.

The horizontal direction low-pass filter 221 calculates an average of the pixel values of the zeroth to second pixel data from the left end of the aligned four pieces of pixel data. This makes it possible to smoothen three pieces of pixel data in the horizontal direction and to suppress aliasing occurring at the time of reduction. The horizontal direction low-pass filter 221 supplies the processing result (that is, the average value) to the horizontal direction linear interpolation unit 223.

The horizontal direction low-pass filter 222 calculates the average of the pixel values of the first to third pixel data from the left end of the four pieces of aligned pixel data. The horizontal direction low-pass filter 222 supplies the processing result to the horizontal direction linear interpolation unit 223.

Note that while the horizontal direction reduction unit 220 calculates the average by the horizontal direction low-pass filters 221 and 222, it is allowable to perform calculation other than average calculation as long as smoothing can be achieved. For example, the horizontal direction reduction unit 220 may calculate a moving average and a median. In addition, the horizontal direction low-pass filters 221 and 222 are examples of a first smoothing processing unit described in the claims.

The horizontal direction linear interpolation unit 223 interpolates the interpolation pixel data by linear interpolation on the basis of the processing results of the horizontal direction low-pass filters 221 and 222. The horizontal direction linear interpolation unit 223 supplies the interpolation pixel data to the vertical direction reduction unit 230.

As described above, the scaler 200 interpolates one pixel every four pixels in the horizontal direction and interpolates one pixel every four pixels in the vertical direction. As a result, the scaler 200 can interpolate one pixel from 4×4 (=16) pixels.

Note that while the horizontal direction reduction unit 220 performs both the smoothing processing and the interpolation processing, it is allowable to perform the smoothing processing alone. For example, the horizontal direction reduction unit 220 may calculate an average value of pixel values of four pieces of pixel data and supply the value as interpolation pixel data to the vertical direction reduction unit 230.

Configuration Example of Vertical Direction Reduction Unit

Figure 6:
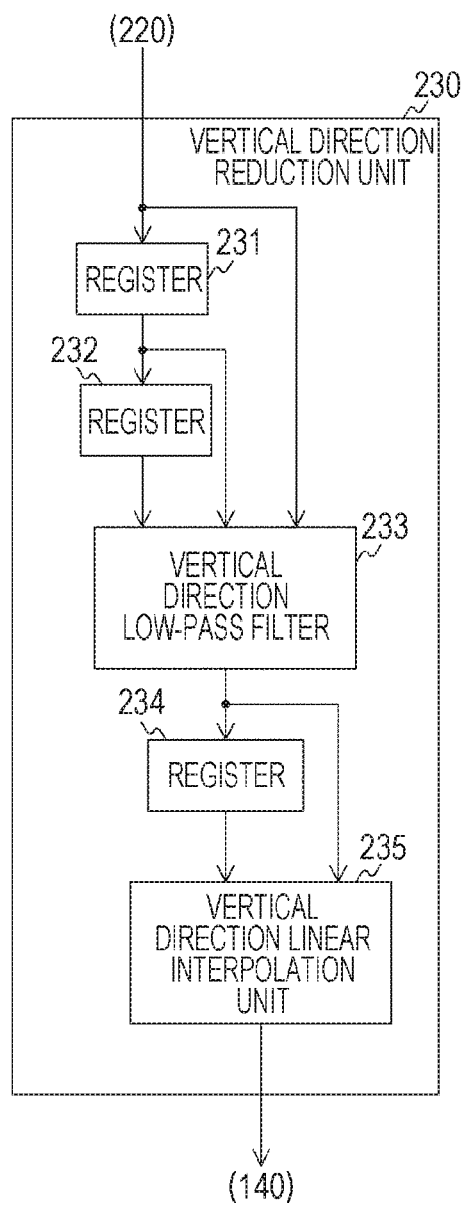
FIG. 6 is a block diagram illustrating a configuration example of a vertical direction reduction unit according to the first embodiment of the present technology.

FIG. 6 is a block diagram illustrating a configuration example of the vertical direction reduction unit 230 in the first embodiment. The vertical direction reduction unit 230 includes registers 231, 232, and 234, a vertical direction low-pass filter 233, and a vertical direction linear interpolation unit 235.

The register 231 holds and delays interpolation pixel data from the horizontal direction reduction unit 220. The register 231 supplies the delayed interpolation pixel data to the register 232 and the vertical direction low-pass filter 233.

The register 232 holds and delays the interpolation pixel data from the register 231. The register 232 supplies the delayed interpolation pixel data to the vertical direction low-pass filter 233.

The vertical direction low-pass filter 233 calculates an average of pixel values of pixel data of three pieces of interpolation pixel data from the horizontal direction reduction unit 220, the register 231, and the register 232. The vertical direction low-pass filter 233 supplies the processing result to the vertical direction linear interpolation unit 235 and the register 234. Note that the horizontal direction low-pass filters 221 and 222 and the vertical direction low-pass filter 233 are examples of the smoothing processing unit described in the claims.

The register 234 holds and delays the processing result of the vertical direction low-pass filter 233. The register 231 supplies the delayed processing result to the vertical direction linear interpolation unit 235.

The vertical direction linear interpolation unit 235 interpolates the interpolation pixel data by using linear interpolation on the basis of the processing results from the vertical direction low-pass filter 233 and the register 234. The vertical direction linear interpolation unit 235 supplies the interpolation pixel data to the write control unit 140. Note that the horizontal direction linear interpolation unit 223 and the vertical direction linear interpolation unit 235 are examples of the interpolation unit described in the claims.

Note that while the vertical direction reduction unit 230 performs both the smoothing processing and the interpolation processing, the vertical direction reduction unit 230 may perform the smoothing processing alone.

Figure 7:
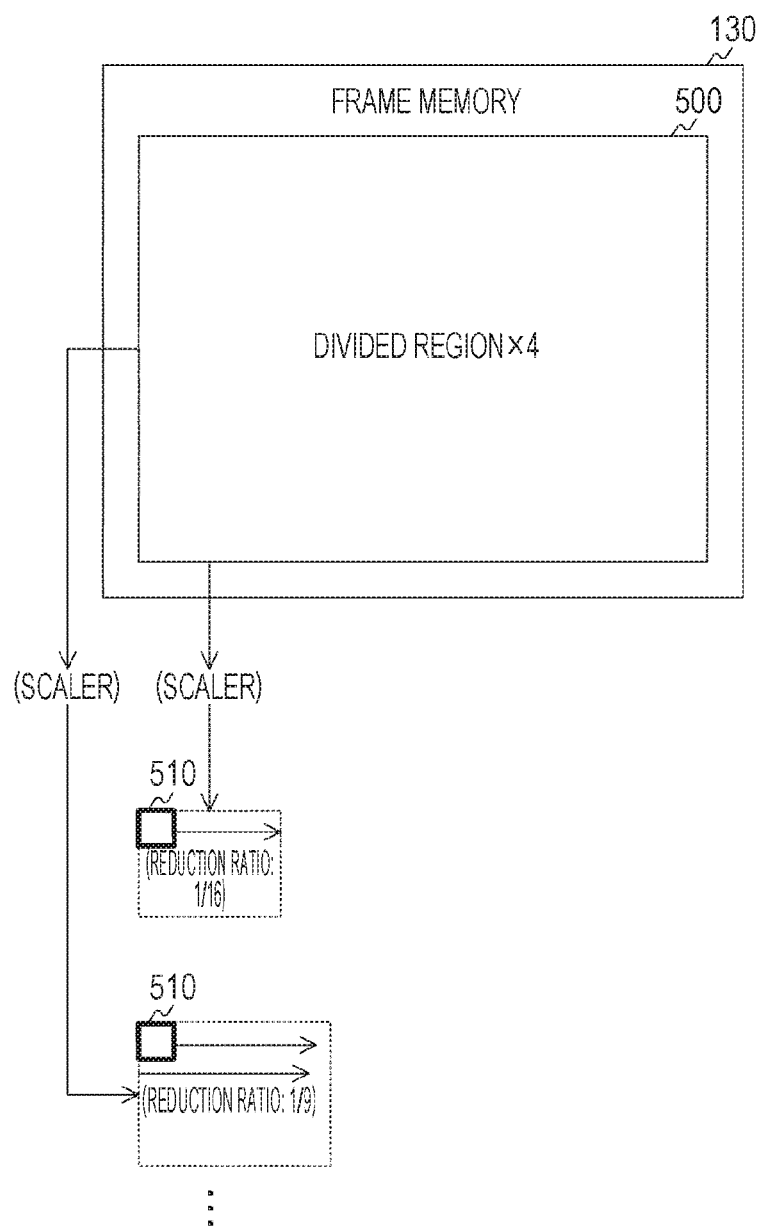
FIG. 7 is a diagram illustrating a method of detecting an object according to the first embodiment of the present technology.

FIG. 7 is a diagram illustrating a method of detecting an object according to the first embodiment. First, the frame memory 130 holds input image data (frames) 500 divided into four divided regions. Then, the scaler control unit 110 sets the reduction ratio to 1/16. The scaler 200 supplies a same relative address as a read address to each of the divided region memories 131 to 134 to simultaneously read four pieces of pixel data arranged in the horizontal direction With execution of reading of four pieces of pixel data four times with sequentially changed addresses in the vertical direction, the scaler 200 obtains 4×4 (=16) pieces of pixel data from the frame memory 130 and interpolates interpolation pixel data on the basis of the obtained pixel data.

The detection window memory 150 holds the detection window 510 in which the interpolation pixel data are arranged in a two-dimensional lattice pattern. In the detection window 510, the detector 160 detects a specific object. The scaler control unit 110 causes the scaler 200 to sequentially move the detection window 510, and the detection window memory 150 is updated together with the movement.

Next, the scaler control unit 110 sets the reduction ratio to 1/9 and causes the scaler 200 to move the detection windows 510 of the same size. Subsequently, the scaler control unit 110 and the scaler 200 perform similar processing with gradually increased reduction ratio. In this manner, with execution of object detection while moving the detection window 510 of the fixed size on the pieces of reduced image data of various sizes, it is possible to detect objects of various sizes within the image.

Note that while the image processing apparatus 100 sets the reduction ratio to gradually increase such as 1/16, 1/9, and so on, it is also allowable to configure to set the reduction ratio to gradually decrease. Furthermore, while the image processing apparatus 100 does not move the detection window in the original input image data, the image processing apparatus 100 may move the detection window in the input image data to detect the object. In this case, it would be sufficient to cause the write control unit 140 to read the detection window from the frame memory 130 and write it in the detection window memory 150.

Figure 8:
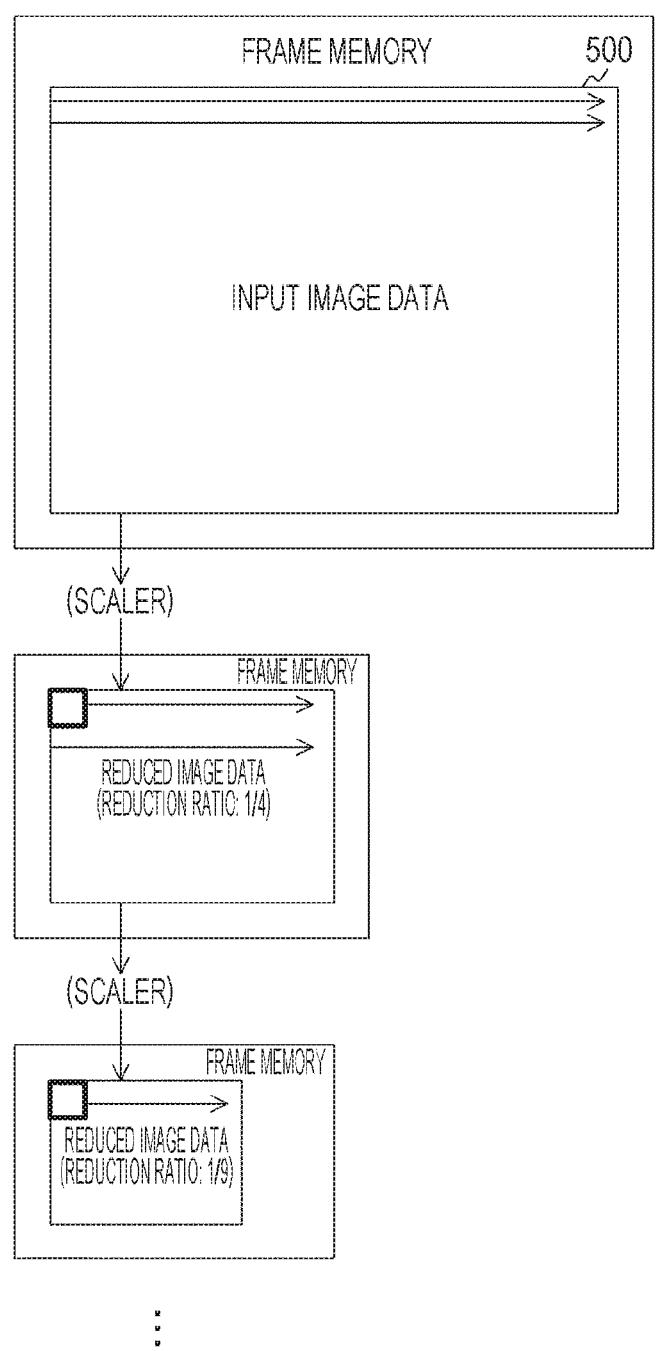
FIG. 8 is a diagram illustrating a method of detecting an object in a comparative example.

FIG. 8 is a diagram illustrating a method of detecting an object in a comparative example in which input image data is held as it is in a frame memory without being divided, and a reduced image is further written back to a frame memory.

In this comparative example, the scaler 200 needs to read pixels 16 times in order to interpolate one pixel. In contrast, the image processing apparatus 100 holds the input image data divided into four regions in the frame memory 130, enabling the scaler 200 to simultaneously read four pixels. With this configuration, it is possible to save the number of times of reading necessary for interpolation of one pixel to four times and thus to improve the reading speed.

Moreover, the scaler in the comparative example writes the reduced image back to the frame memory, and further reduces the reduced image so as to gradually reduce the size of an image. In order to hold all the reduced image data in the frame memory, memory resources would be needed correspondingly.

For example, it is assumed that the size of the input image data is 192×108 pixels and processing of reducing the data size in the horizontal direction and the vertical direction to 27/32 times is repeated 10 times. This operation would generate 10 pieces of reduced image data having sizes of 162×91, 137×77, 115×65, 97×55, 82×46, 69×39, 58×33, 49×28, 41×23, and 35×20 pixels. In order to hold all the reduced image data and the original input image data in the frame memory, a memory capacity of 70229 pixels would be needed according to the following formula.

$$70229=192\times108+162\times91+137\times77+115\times65+97\times55+\\82\times46+69\times39+58\times33+49\times28+41\times23+35\times20$$

In contrast, the image processing apparatus 100 holds the input image data 500 and the detection window 510 alone in the memory as illustrated in FIG. 7. When the detection window 510 has a size of 22×20 pixels, the memory capacity as small as 21176 pixels would be needed according to the following formula.

$$21176=192\times108+22\times20$$

As described above, the image processing apparatus 100 is capable of reducing the memory capacity as compared with the comparative example. It would be possible, in the comparative example, to overwrite reduced image data to be created second or subsequent times on the input image data region or the like. However, even with this configuration, 35478 pixels would still be needed according to the following formula, leading to larger memory requirement than the image processing apparatus 100.

$$35478=192\times108+162\times91$$

Furthermore, the comparative example generates the third and subsequent reduced image data from an immediately preceding reduced image data, leading to significant deterioration of the image quality of the reduced image data each time the reduction is performed, lowering the detection accuracy. In contrast, the image processing apparatus 100 generates each of the reduced image data from the original input image data, making it possible to suppress the deterioration of the image quality of the reduced image data, leading to improvement of the detection accuracy.

In addition, the comparative example has difficulty in gradually increasing the reduction ratio from the viewpoint of suppressing deterioration of image quality. In contrast, it is possible to gradually increase the reduction ratio without deteriorating the image quality in the image processing apparatus 100 since each of the reduced image data is generated from the original input image data. As a result, an object of a large size can be detected with high accuracy at an early stage.

Figure 9:
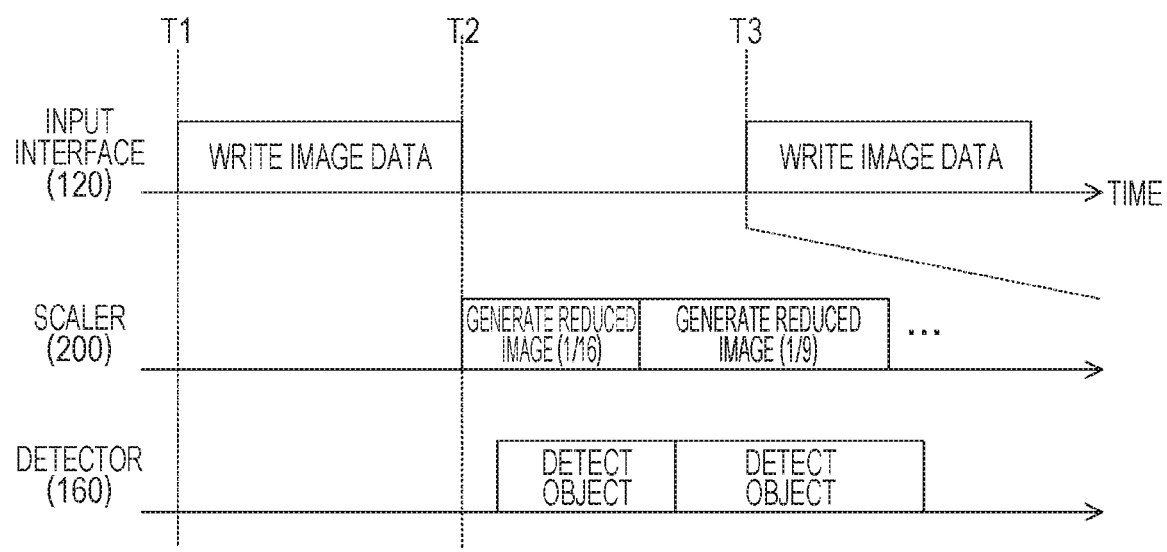
FIG. 9 is a timing chart illustrating an example of operation of the image processing apparatus according to the first embodiment of the present technology.

FIG. 9 is a timing chart illustrating an example of operation of the image processing apparatus according to the first embodiment of the present technology. Input image data is input at timing T1, and then, the input interface 120 divides the image data and writes the divided image data into the frame memory 130 before timing T2.

At timing T2, the scaler 200 generates reduced image data with a reduction ratio of 1/16, and then generates reduced image data with a reduction ratio of 1/9. Thereafter, the scaler 200 generates a plurality of pieces of reduced image data while gradually increasing the reduction ratio until the timing T3. Along with this, the detector 160 performs object detection in each of pieces of the reduced image data during the period from the timing T2 to the timing T3.

Input image data is input at timing T3, and then, the input interface 120 divides the image data and writes the divided image data into the frame memory 130. The scaler 200 and the detector 160 perform reduction of the written image data and detection of the object.

Figure 10:
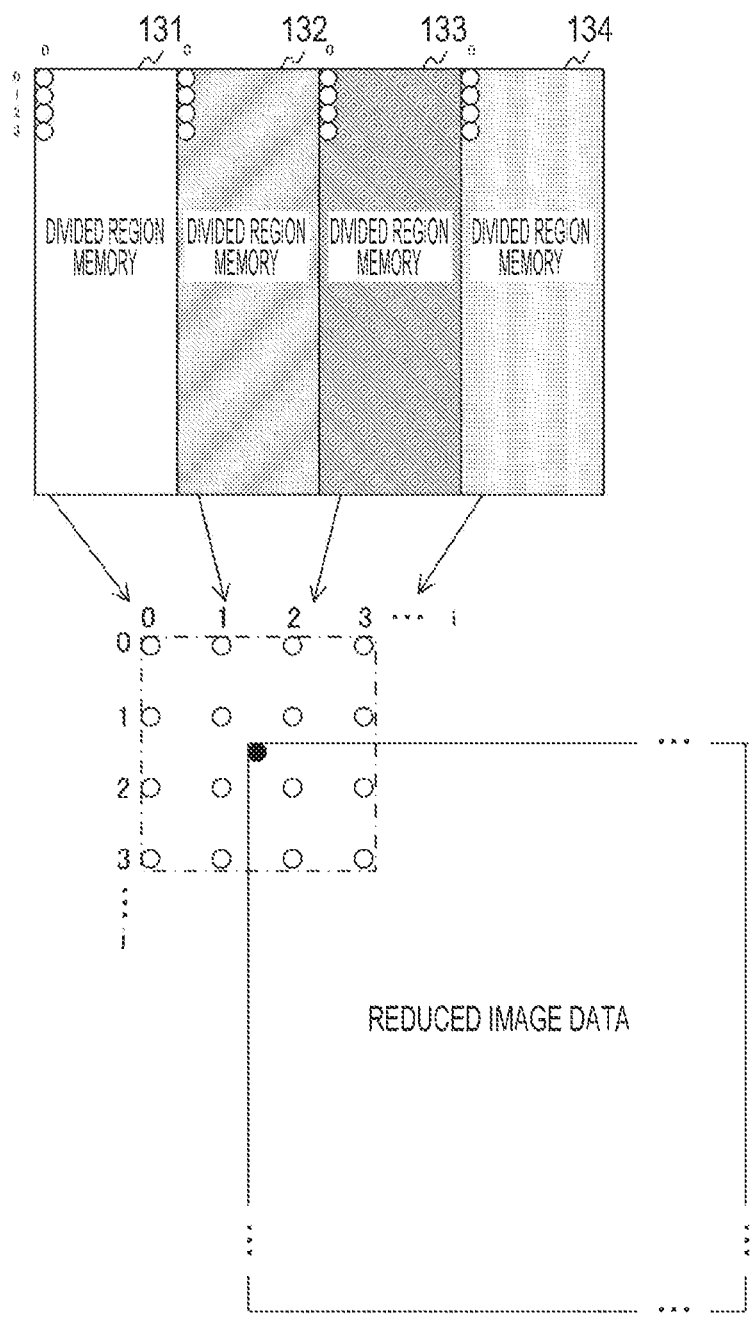
FIG. 10 is a diagram illustrating operation of interpolating a first pixel in the first embodiment of the present technology.

FIG. 10 is a diagram illustrating operation of interpolating the first pixel in the first embodiment. In the figure, white symbols indicate positions of pixel data in the input image data, and a black symbol indicates the position of pixel data (that is, interpolation pixel data) in the reduced image data. Now, the following is a case where pixels are interpolated to the address (1.5, 1.5) in the input image data. Among the 4×4 pixel data around this address, the zeroth column is held in the divided region memory 131, and the first column is held in the divided region memory 132. Furthermore, the second column is held in the divided region memory 133, and the third column is held in the divided region memory 134.

First, the scaler 200 simultaneously reads four pieces of pixel data from each of the relative addresses (0, 0) of the divided region memories 131 to 134. Next, the scaler 200 simultaneously reads four pieces of pixel data from the relative address (0, 1). Similarly, pixel data is read from relative addresses (0, 2) and (0, 3). With this four times of reading, 16 pieces of pixel data are read. The scaler 200 generates and outputs one piece of interpolation pixel data from the read 16 pixel data.

Figure 11:
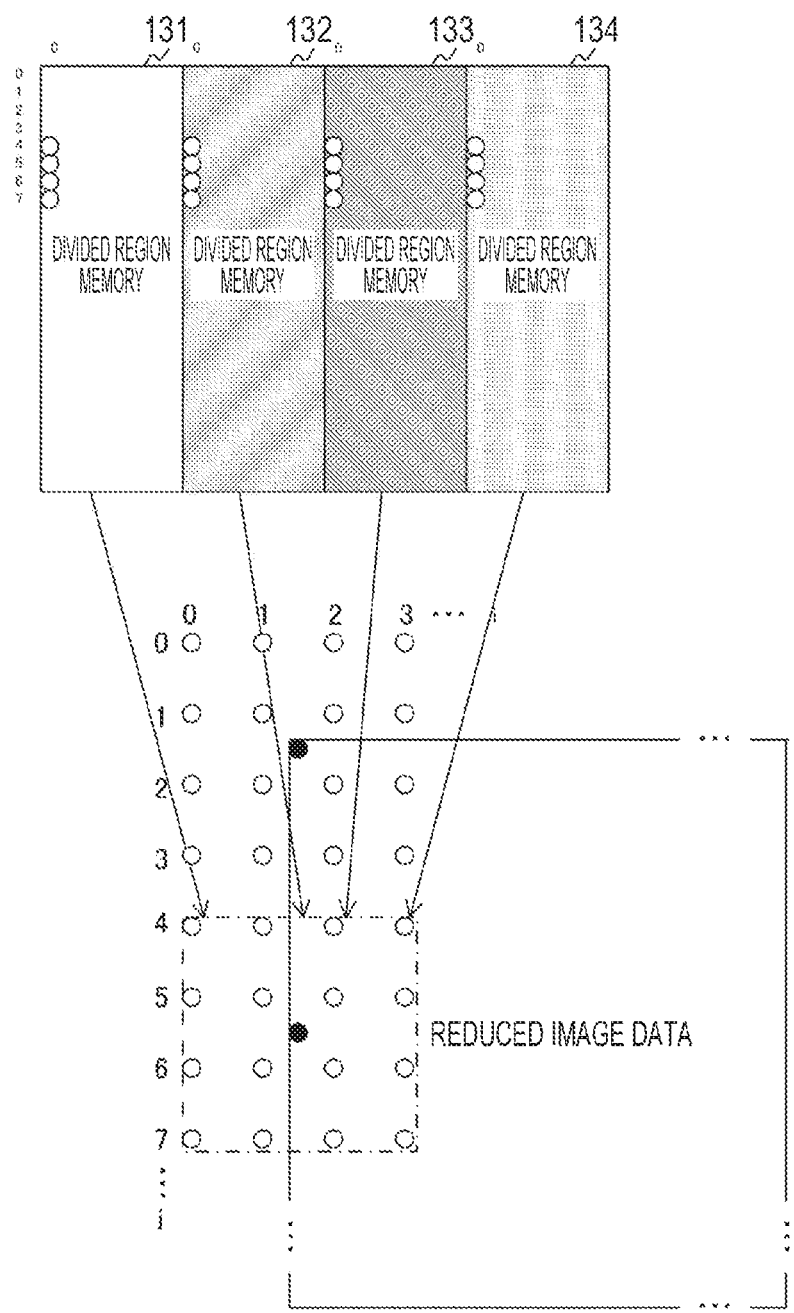
FIG. 11 is a diagram illustrating operation of interpolating the second pixel in the first embodiment of the present technology.

FIG. 11 is a diagram illustrating operation of interpolating the second pixel in the first embodiment. Now, the following is a case where pixels are interpolated to the address (1.5, 5.5) in the input image data.

The scaler 200 simultaneously reads four pieces of pixel data from the relative address (0, 4) of each of the divided region memories 131 to 134. Next, the scaler 200 simultaneously reads four pieces of pixel data from the relative address (0, 5). Similarly, pixel data is read from relative addresses (0, 6) and (0, 7). With this four times of reading, 16 pieces of pixel data are read. The scaler 200 generates and outputs one piece of interpolation pixel data from the read 16 pixel data.

In this manner, the pieces of interpolation pixel data are sequentially output along the vertical direction. In addition, the scaler control unit 110 increments the address in the horizontal direction every time the interpolation pixel data is output for the vertical direction size (20 pixels or the like) of the detection window. With repetition of this processing, the position of the detection window in the horizontal direction approaches the right end.

Then, when the address in the horizontal direction reaches the right end, the scaler control unit 110 initializes the address in the horizontal direction and increments the address in the vertical direction. With this operation, the position of the detection window in the horizontal direction is folded back to the left end, and the position thereof in the vertical direction approaches the lower end.

Figure 12:
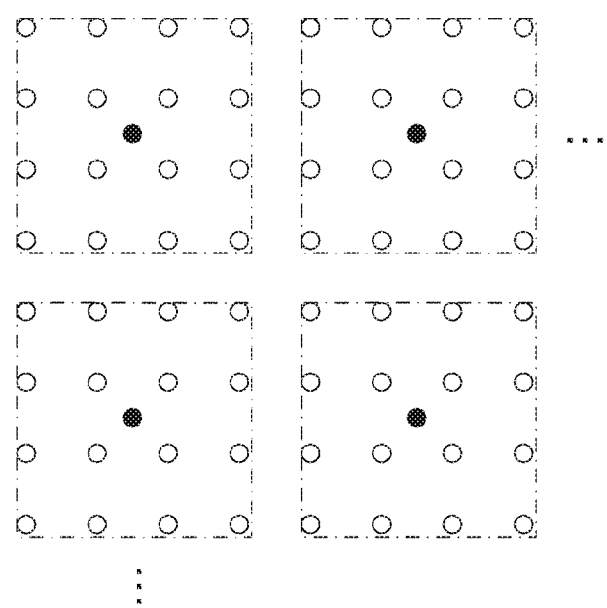
FIG. 12 is a diagram illustrating an example of pixel data in an image before and after reduction when the reduction ratio is 1/16 in the first embodiment of the present technology.

FIG. 12 is a diagram illustrating an example of pixel data in an image before and after reduction when the reduction ratio in the first embodiment is 1/16. In the figure, white dots indicate pixel data in input image data before reduction, and black dots indicate positions of interpolation pixel data in the reduced image data. In a case where the reduction ratio is set to 1/16, the address to be interpolated is incremented by "4" in the horizontal direction and the vertical direction. For example, an address of (1.5, 5.5) is input to the scaler 200 next to the address of (1.5, 1.5). With this operation, the input image data is reduced to 1/4 in the horizontal direction and the vertical direction, and is reduced to 1/16 as a whole.

FIG. 13 is a diagram illustrating an example of pixel data in an image before and after reduction when the reduction ratios are 1/9 and 1/4 in the first embodiment. In the figure, a represents an example of pixel data when the reduction ratio is 1/9, and in the figure, b represents an example of pixel data when the reduction ratio is 1/4.

In a case where the reduction ratio is set to 1/9, the address to be interpolated is incremented by "3" in the horizontal direction and the vertical direction. For example, an address of (1.5, 4.5) is input to the scaler 200 next to the address of (1.5, 1.5). With this operation, the input image data is reduced to 1/3 in the horizontal direction and the vertical direction, and is reduced to 1/9 as a whole.

In a case where the reduction ratio is set to 1/2, the address to be interpolated is incremented by "2" in the horizontal direction and the vertical direction. For example, an address of (1.5, 3.5) is input to the scaler 200 next to the address of (1.5, 1.5). With this operation, the input image data is reduced to 1/2 in the horizontal direction and the vertical direction, and is reduced to 1/4 as a whole. In this manner, the increment number of the address to be interpolated is changed with the reduction ratio. For example, when the data is to be reduced to 1/c in the horizontal direction, the address in the horizontal direction is incremented by "c".

Figure 14:
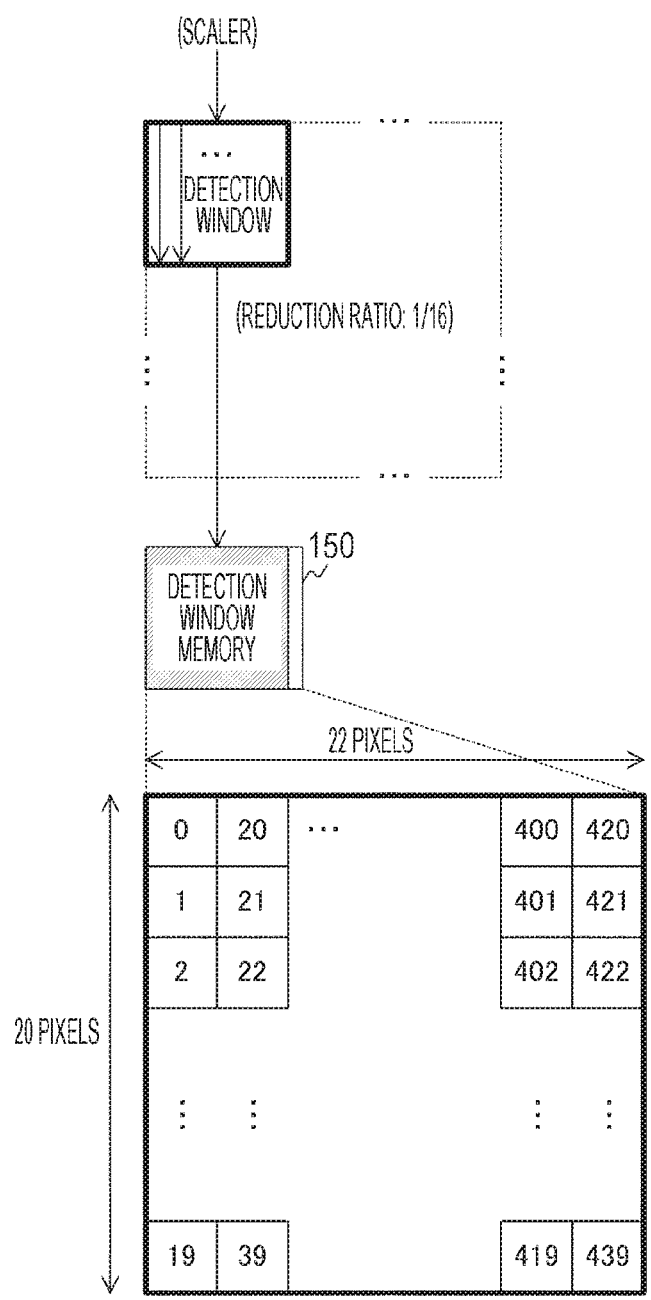
FIG. 14 is a diagram illustrating a writing method to a detection window memory according to the first embodiment of the present technology.

FIG. 14 is a diagram illustrating a writing method to the detection window memory 150 according to the first embodiment. The size of the detection window is set to 20×20 pixels, for example. The exemplary size of the detection window memory 150 is 22 pixels in the horizontal direction and 20 pixels in the vertical direction. That is, the size of the detection window memory 150 is larger by two columns (=2×20 pixels) than the detection window. In addition, each of addresses "0" to "439" is allocated to each of storage regions of the interpolation pixel data within the detection window memory 150, with the addresses incrementing by "1" in the vertical direction and incrementing by "20" in the vertical direction. Note that the size of the detection window is not limited to 20×20 pixels as long as it is smaller than the reduced image data.

The scaler control unit 110 sequentially increments the address in the vertical direction and supplies it to the scaler 200, and increments the address in the horizontal direction each time 20 addresses are provided. With this configuration, the scaler 200 sequentially outputs pixel data in the vertical direction, turns back at the lower end of the detection window to move to the next column.

The write control unit 140 writes the interpolation pixel data output as pth (p is an integer) output into an address p in the detection window memory 150. Then, when a detection window including 20×20 pieces of interpolation pixel data has been written, the detector 160 reads the detection window and starts detection of the object. In this figure, the hatched portion in the detection window memory 150 indicates the region in which the interpolation pixel data has been written.

In this manner, the scaler 200 sequentially outputs the pixel data in the vertical direction and turns back at the lower end of the detection window, making it possible to reduce the number of times of turning as compared with the case where the pixel data is sequentially output in the horizontal direction.

FIG. 15 is a diagram illustrating a method of moving a detection window according to the first embodiment. As illustrated in a in the figure, after 400 pieces of interpolation pixel data have been output, the scaler control unit 110 increments the address in the horizontal direction and then increments the address in the vertical direction sequentially from the initial value to obtain 20 pieces of interpolation pixel data. Then, the scaler control unit 110 executes similar processing again. With this processing, interpolation pixel data of 2 columns×20 rows is output, and then, the detection window is moved toward the right end by two columns. The write control unit 140 writes these pieces of 40 interpolation pixel data to the addresses "400" to "439" in the detection window memory 150. The detector 160 reads the detection window from the addresses "40" to "439" and detects the object. In a of the figure, the hatched portion in the detection window memory 150 indicates the region in which the interpolation pixel data has been newly written.

Number of pixels L read from the frame memory 130 when interpolating these 2×20 pixels is expressed by the following formula where the reduction ratio in the horizontal direction is Ch and the reduction ratio in the vertical direction is Cv.

$$L=(2/Ch+2)\times(20/Cv+2)$$

In an assumable configuration in which the L pixels are read in synchronization with predetermined clock signals, L clocks would be needed to read L pixels. In a case, however, where the input image data is divided into 2/Ch (four, for example) and held in the frame memory 130, the scaler 200 can read L pixels with 2×(20/Cv+2) clocks.

Subsequently, as exemplified with b in the figure, the scaler control unit 110 further outputs 2×20 pieces of interpolation pixel data and moves the detection window to the right end by two columns. The write control unit 140 writes these 40 pieces of interpolation pixel data to the addresses "0" to "39" in the detection window memory 150. The detector 160 reads the detection windows from the addresses "0" to "399" and detects the object.

Hereinafter, the scaler control unit 110 uses similar processing to move the detection window to the right end within the reduced image. When the detection window reaches the right end, the scaler control unit 110 initializes the position of the detection window in the horizontal direction to the left end, and moves the position in the vertical direction to the lower end. The write control unit 140 writes the interpolation pixel data output as the pth output into an address q represented by the following formula.

$$q=\mathrm{mod}\{(20\times h+p)/440\}$$

In the above formula, h indicates a position of the representative point (upper left apex, or the like) of the detection window in the horizontal direction.

In this manner, the write control unit 140 logically circulates the write destination address of the detection window memory 150 in the horizontal direction. In other words, the detection window memory 150 is used as a ring buffer in the horizontal direction.

Example of Operation of Image Processing Apparatus

Figure 16:
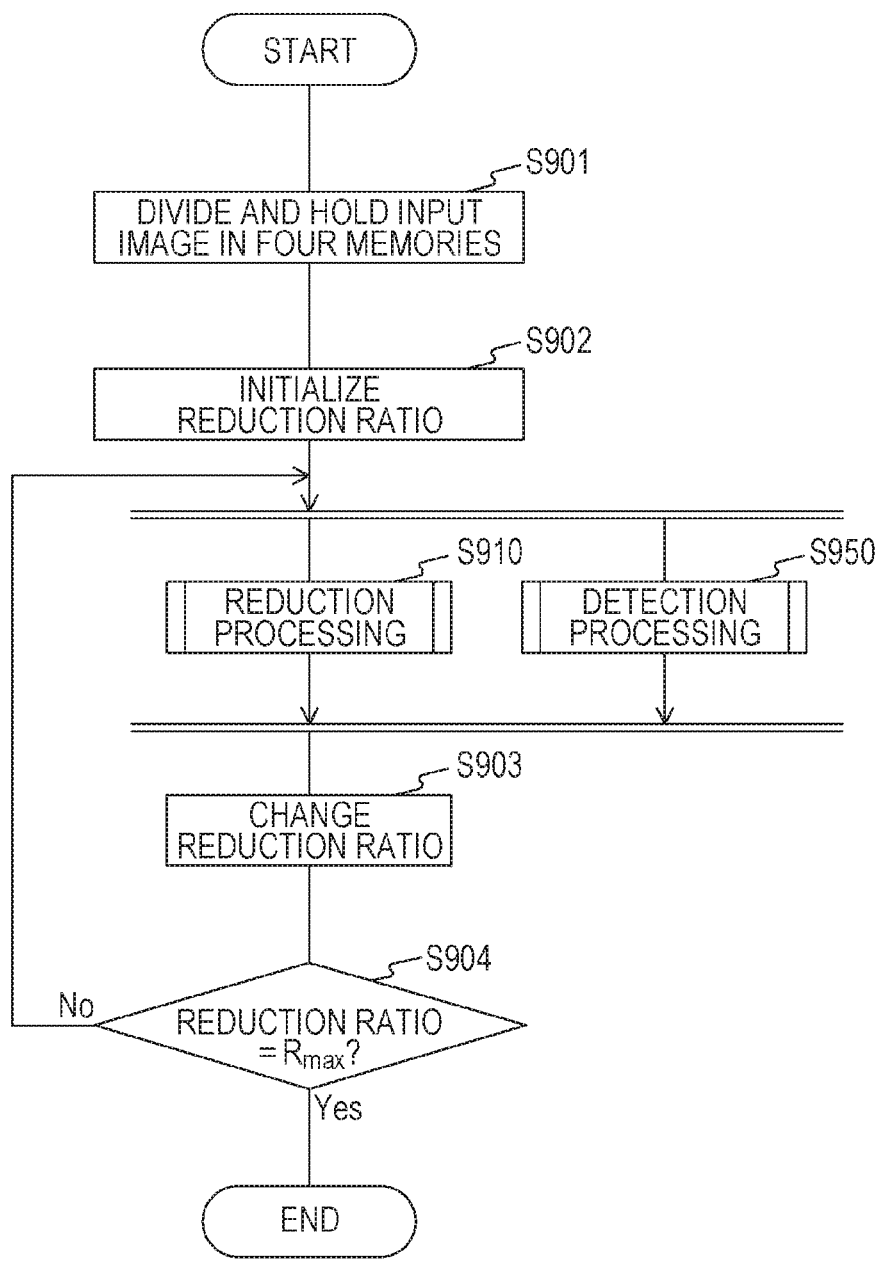
FIG. 16 is a flowchart illustrating an example of operation of the image processing apparatus according to the first embodiment of the present technology.

FIG. 16 is a flowchart illustrating an example of operation of the image processing apparatus 100 according to the first embodiment. This operation is started when input image data has been input to the image processing apparatus 100.

The image processing apparatus 100 holds the input image data divided into the four memories (131 to 134) (step S901). The image processing apparatus 100 initializes the reduction ratio to a predetermined value (step S902), and then, executes reduction processing (step S910) of reducing the image and detection processing (step S950) of detecting an object in parallel.

After each of steps S910 and S950, the image processing apparatus 100 changes the reduction ratio (step S903) and judges whether or not the reduction ratio is a maximum value Rmax (step S904). In a case where the reduction ratio is not the maximum value Rmax (step S904: No), the image processing apparatus 100 repeats execution of steps S910 and S950. In contrast, in a case where the reduction ratio is the maximum value Rmax (step S904: Yes), the image processing apparatus 100 finishes the image processing.

Figure 17:
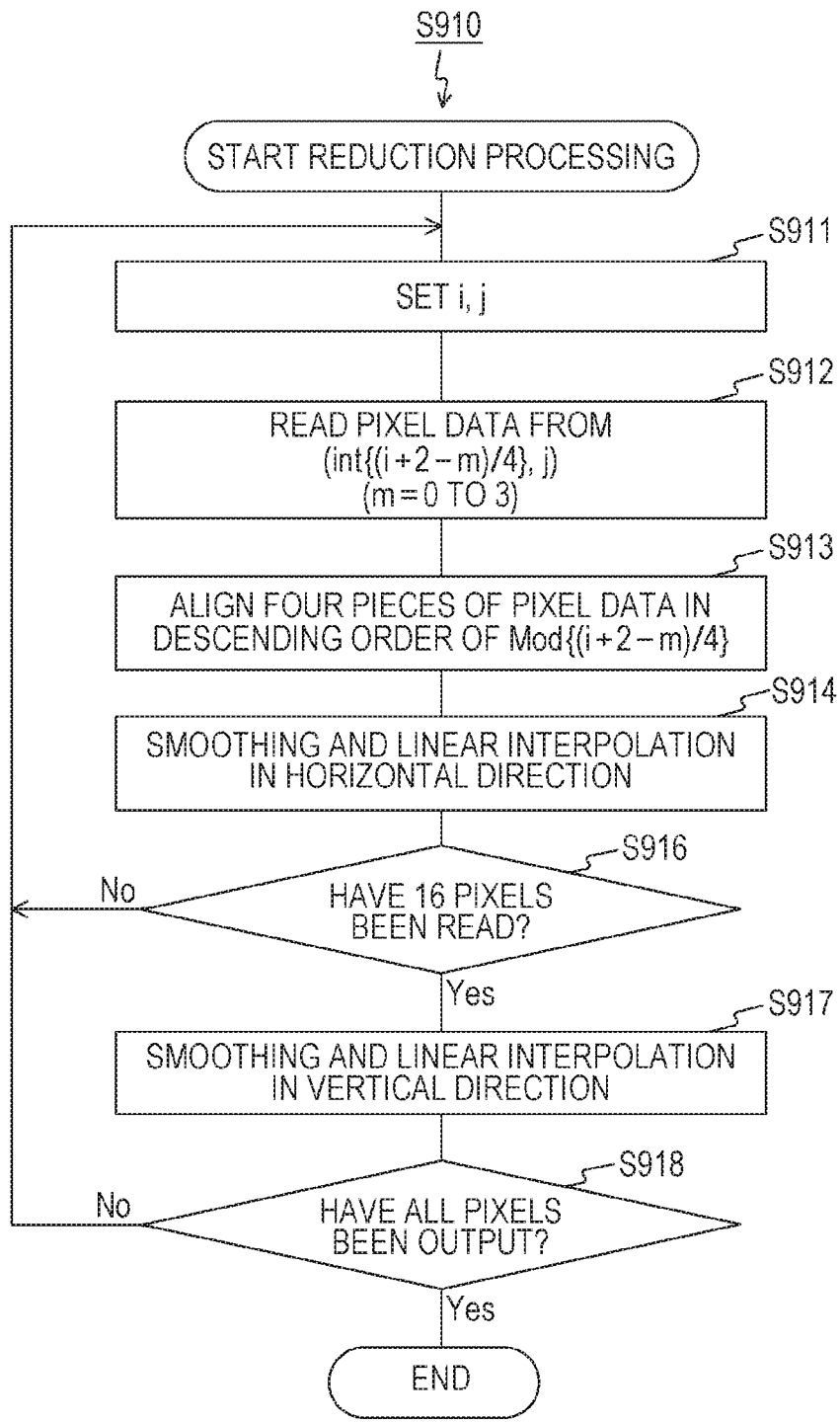
FIG. 17 is a flowchart illustrating reduction processing according to the first embodiment of the present technology.

FIG. 17 is a flowchart illustrating reduction processing according to the first embodiment. The scaler control unit 110 sets the address (i, j) to be interpolated (step S911). The scaler 200 simultaneously reads the pixel data from the relative addresses (int{(i++2−m)/4}, j) of four memories (step S912). Subsequently, the scaler 200 aligns the pixel data in descending order of mod {(i+2−m)/4} (step S913) and performs smoothing and linear interpolation in the horizontal direction (step S914).

The scaler 200 judges whether or not 4×4 (=16) pixels have been read (step S916). In a case where 16 pixels have not been read (step S916: No), the image processing apparatus 100 repeats step S911 and the subsequent steps.

In contrast, in a case where the 16 pixels have been read (step S916: Yes), the scaler 200 performs smoothing and linear interpolation in the vertical direction (step S917). Then, the scaler 200 judges whether or not all the pixels in the reduced image have been output (step S918). In a case where not all pixels have been output (step S918: No), the image processing apparatus 100 repeats step S911 and the subsequent steps. In a case where all pixels have been output (step S918: Yes), the image processing apparatus 100 finishes the reduction processing.

Figure 18:
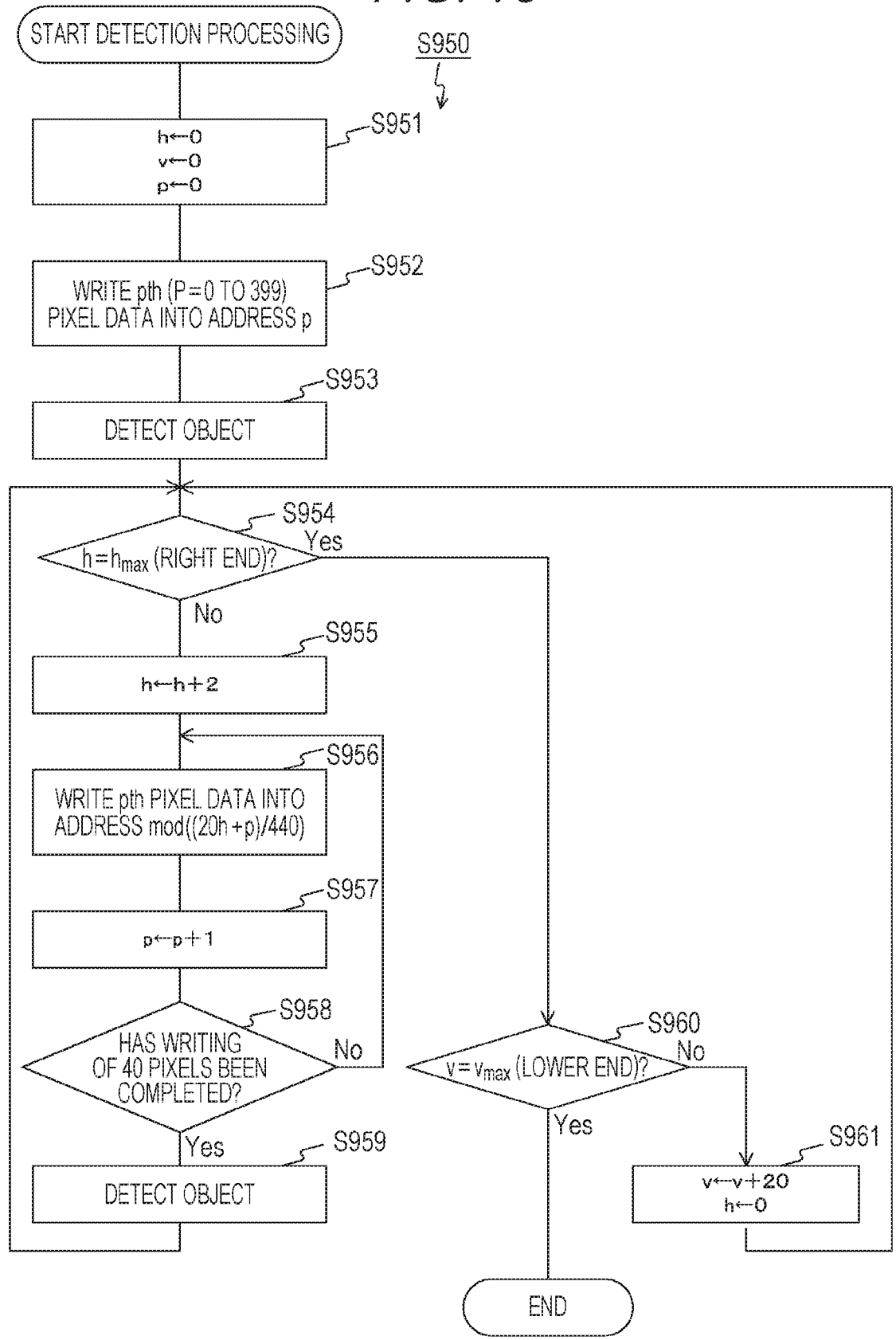
FIG. 18 is a flowchart illustrating detection processing in the first embodiment of the present technology.

FIG. 18 is a flowchart illustrating detection processing according to the first embodiment. The scaler control unit 110 initializes h, v, and p to "0" (step S951). h indicates a position of a representative point of the detection window in the horizontal direction, and v indicates a position of the representative point in the horizontal direction.

The write control unit 140 writes the zeroth to 399th interpolation pixel data into the corresponding address in the detection window memory 150 (step S952). The detector 160 reads the detection window and detects the object (step S953).

Subsequently, the scaler control unit 110 judges whether or not h is $h_{max}$ (step S954). Here, $h_{max}$ is a position when the detection window reaches the right end of the reduced image data. In a case where h is not $h_{max}$ (step S954: No), the scaler control unit 110 increments h by "2" (step S955). The write control unit 140 writes the pth interpolation pixel data into the address mod {(20×h+p)/440} in the detection window memory 150 (step S956).

The scaler control unit 110 increments p by "1" (step S957) and judges whether or not writing of 2×20 (=40) pixels of data has been completed (step S958). In a case where writing of 2×20 (=40) pieces of data has not been completed (step S958: No), the image processing apparatus 100 repeats execution of step S956 and the subsequent steps.

In contrast, in a case where writing of 2×20 (=40) pieces of data has been completed (step S958: Yes), the detector 160 reads the detection window and detects the object (step S959). After processing of step S959, the image processing apparatus 100 repeats execution of step S954 and the subsequent steps.

Moreover, in a case where h is $h_{max}$ (step S954: Yes), the scaler control unit 110 judges whether or not v is $v_{max}$ (step S960). Here, $v_{max}$ is a position at which the detection window reaches the lower end of the reduced image data. In a case where v is not $v_{max}$ (step S960: No), the scaler control unit 110 initializes h to "0" and increments v by "20" (step S961). After step S961, the image processing apparatus 100 repeats execution of step S954 and the subsequent steps. In contrast, in a case where v is $v_{max}$ (step S960: Yes), the image processing apparatus 100 finishes the detection processing.

In this manner, according to the first embodiment of the present technology, four pieces of pixel data aligned in the horizontal direction are written to be distributed over four memories and are read simultaneously and smoothed in the horizontal direction, making it possible to reduce the number of pixel reading times as compared with the case of not performing distributed writing. With this configuration, it is possible to improve the reading speed of image data.

2. Second Embodiment

In the first embodiment described above, the image processing apparatus 100 reads the original input image data again each time the reduction ratio is changed in generation of reduced image data. With this configuration, however, the more the number of times of changing the reduction ratio, the more the number of times of reading the input image data, leading to an increase in the total time taken for reading. The image processing apparatus 100 according to a second embodiment is different from the first embodiment in that the reading speed of image data is further increased.

Figure 19:
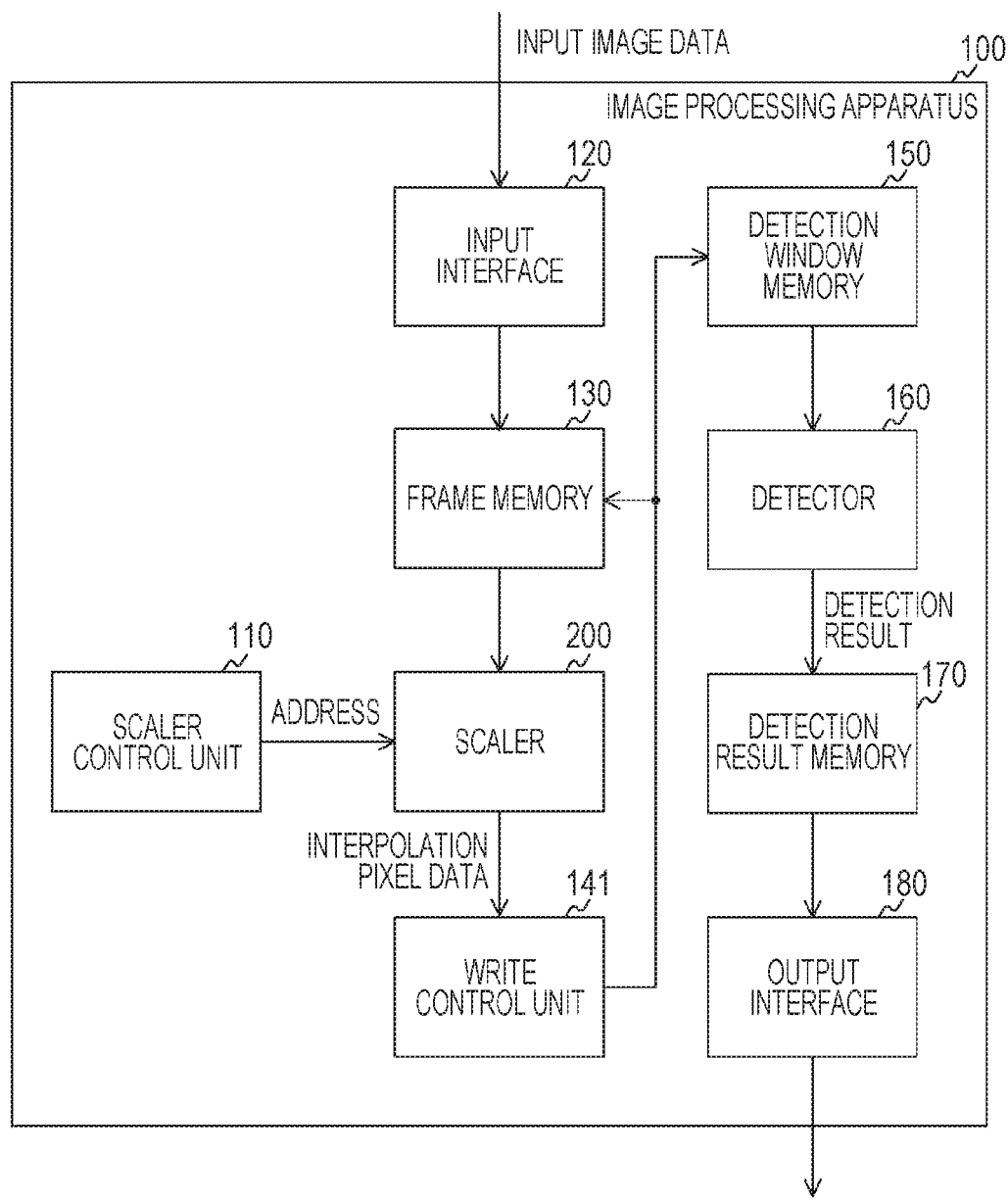
FIG. 19 is a block diagram illustrating a configuration example of an image processing apparatus according to a second embodiment of the present technology.

FIG. 19 is a block diagram illustrating a configuration example of the image processing apparatus 100 according to a second embodiment. The image processing apparatus 100 according to the second embodiment is different from the first embodiment in that a write control unit 141 is provided in place of the write control unit 140.

The write control unit 141 is different from the case of the first embodiment in that the reduced image data is written back to the frame memory 130 while the detection window is written into the detection window memory 150.

Figure 20:
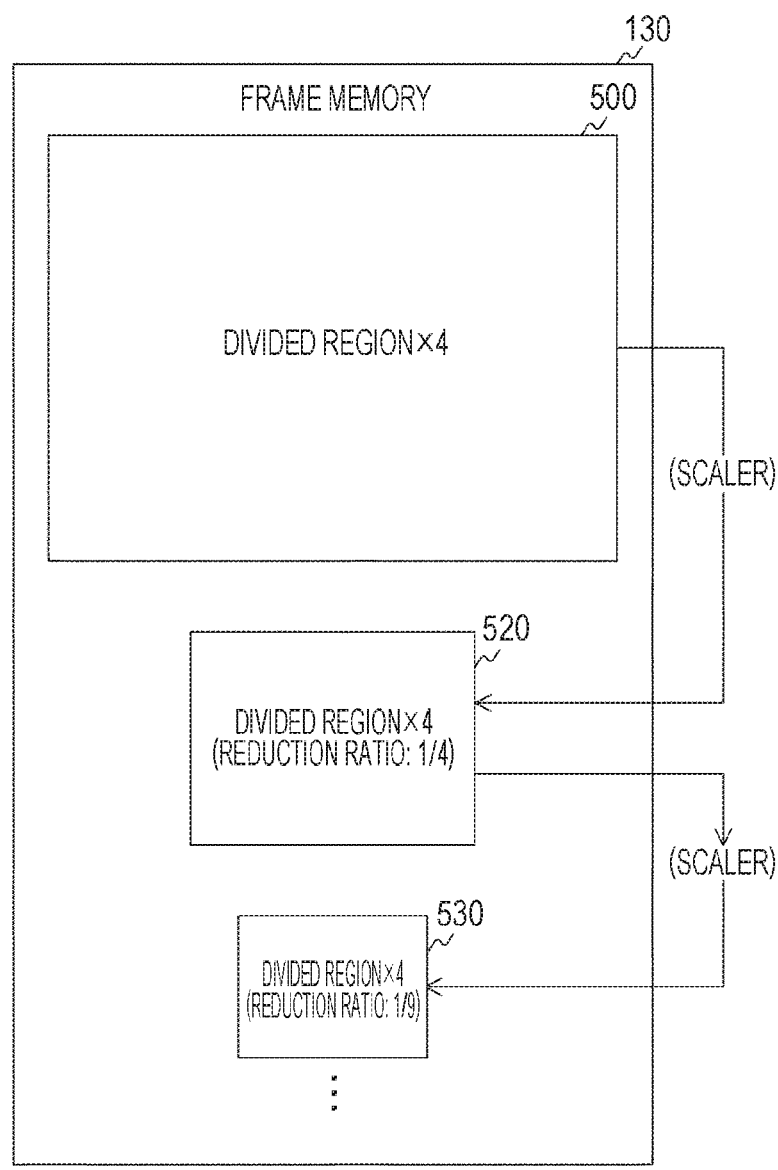
FIG. 20 is a diagram illustrating an access method of a frame memory according to the second embodiment of the present technology.

FIG. 20 is a diagram illustrating an access method of the frame memory 130 in the second embodiment. The scaler 200 reads the divided region before reduction and generates reduced image data reduced to 1/4. The write control unit 141 divides the reduced image data into four divided regions and writes back the divided image data to the frame memory 130. The scaler 200 reads the reduced divided region and further reduces it to generate reduced image data. Thereafter, similar processing is repeatedly executed with the reduction ratio gradually reduced.

The size of the reduced image data to be read from the frame memory 130 decreases each time the reduction is performed, making it possible to shorten the total time of reading image data than in the first embodiment. Note that the write control unit 141 may overwrite the reduced image data generated in the second and subsequent times on the region holding the data before reduction.

As described above, according to the second embodiment of the present technology, the image processing apparatus 100 writes the reduced image data back to the frame memory 130, reads and further reduces the reduced image data, making it possible to shorten the time required for reading the image data.

3. Third Embodiment

In the first embodiment described above, the capacity of the frame memory 130 is for one frame. Accordingly, at continuous input of a plurality of pieces of input image data (frames), the image processing apparatus 100 used to update the frame memory 130 at every execution of an input of each of the second and the subsequent images. With this configuration, it is impracticable to shorten the frame interval than the delay time taken for object detection, making it difficult to increase the frame rate to improve the throughput. The image processing apparatus 100 according to a third embodiment is different from the first embodiment in that throughput is improved.

Figure 21:
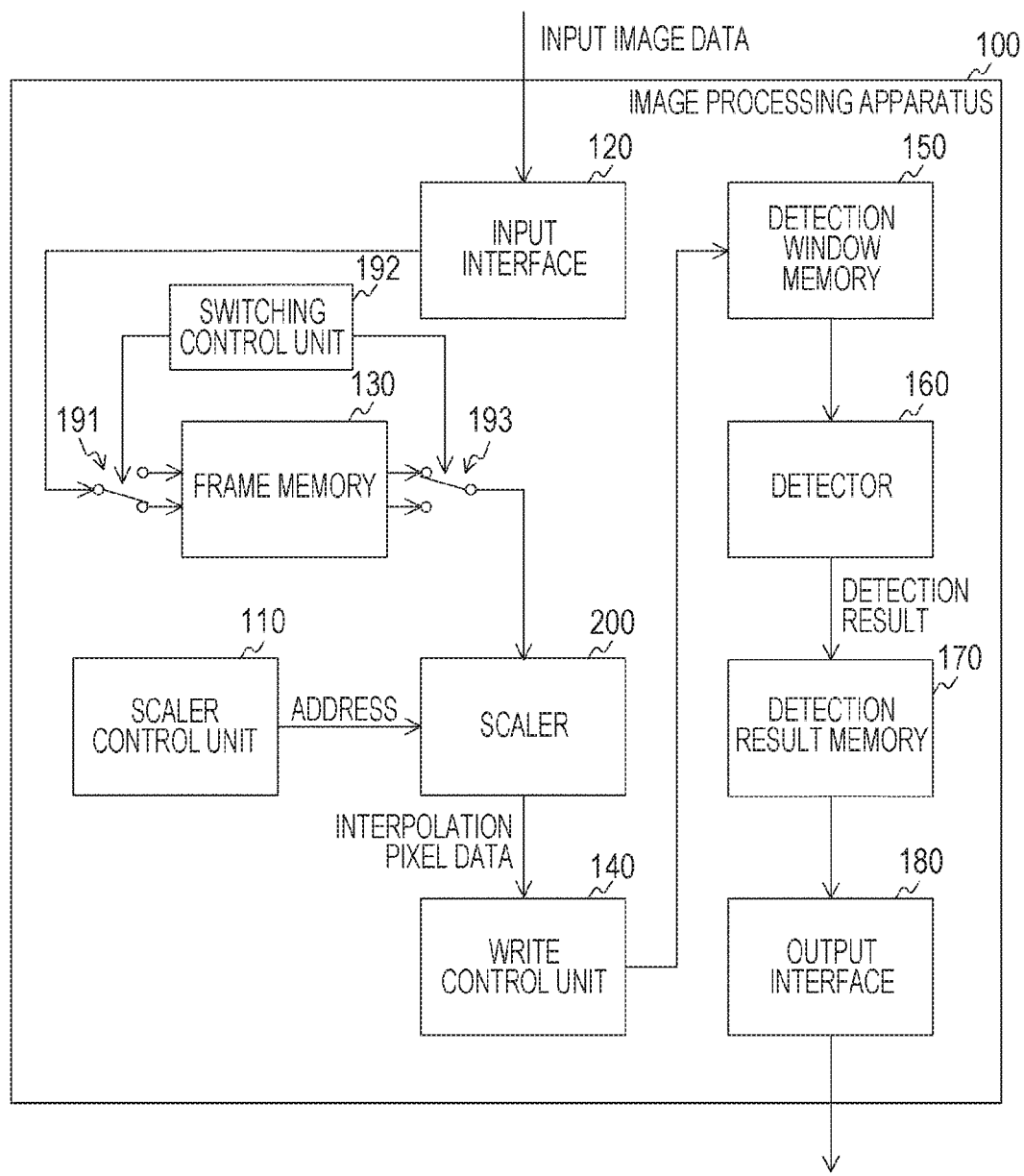
FIG. 21 is a block diagram illustrating a configuration example of an image processing apparatus according to a third embodiment of the present technology.

FIG. 21 is a block diagram illustrating a configuration example of the image processing apparatus 100 according to the third embodiment. The image processing apparatus 100 according to the third embodiment is different from the first embodiment in that it further includes switches 191 and 193 and a switching control unit 192. In addition, the frame memory 130 of the third embodiment is divided into odd number regions and even number regions, and it is possible to write data of one frame into each of the regions.

The switch 191 switches the output destination of the divided region from the input interface 120 to one of the odd number region and the even number region under the control of the switching control unit 192. The switch 193 switches the input source to one of the odd number region and the even number region under the control of the switching control unit 192 and outputs data from the selected region to the scaler 200.

The switching control unit 192 controls the switch 191 and the switch 193. When the odd numbered input image data is input, the switching control unit 192 switches the output destination of the switch 191 to the odd number region side and switches the input source of the switch 193 to the even number region side. In addition, when the even numbered input image data is input, the switching control unit 192 switches the output destination of the switch 191 to the even number region side and switches the input source of the switch 193 to the odd number region side.

Figure 22:
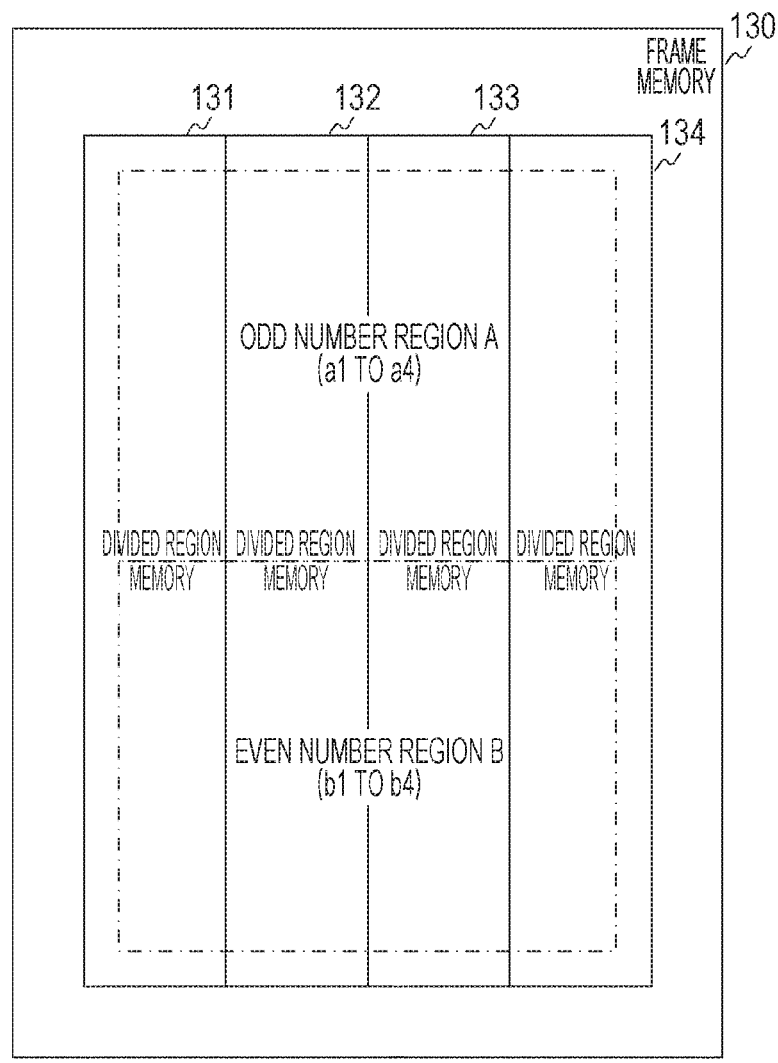
FIG. 22 is a diagram illustrating a configuration example of a frame memory according to the third embodiment of the present technology.

FIG. 22 is a diagram illustrating a configuration example of the frame memory 130 according to the third embodiment. In the frame memory 130, the divided region memory 131 is divided into an odd number region a1 and an even number region b1, while the divided region memory 132 is divided into an odd number region a2 and an even number region b2. Furthermore, the divided region memory 133 is divided into an odd number region a3 and an even number region b3, while the divided region memory 134 is divided into an odd number region a4 and an even number region b4.

An odd number region A including the odd number regions a1 to a4 holds divided regions corresponding to the odd numbered input image data. In addition, an even number region B including the even number regions b1 to b4 holds divided regions corresponding to the even numbered input image data.

Figure 23:
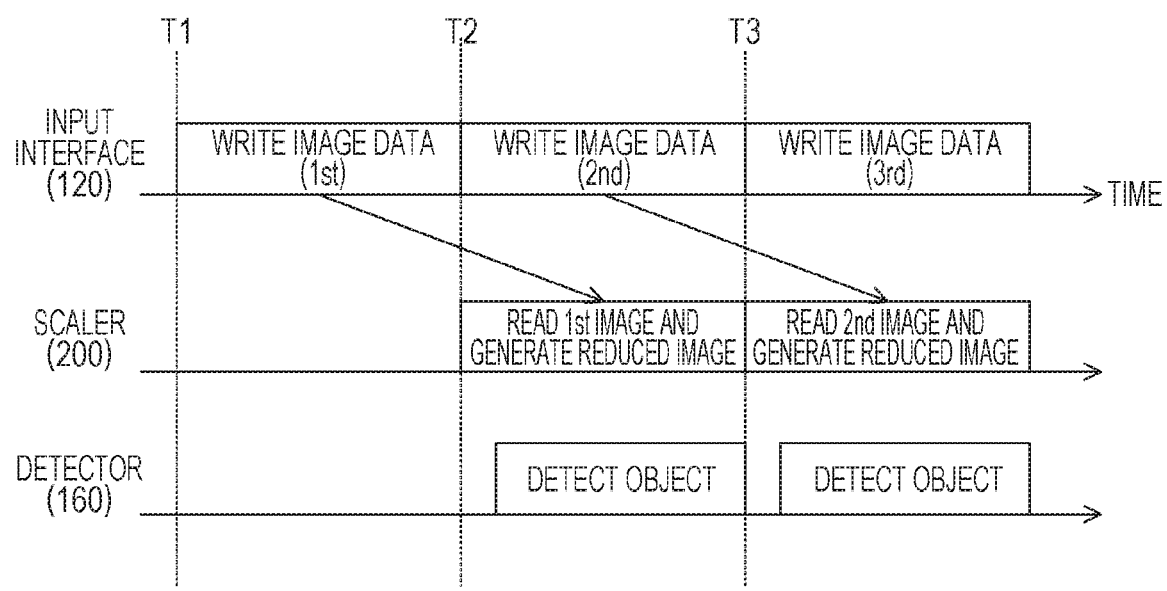
FIG. 23 is a timing chart illustrating an example of operation of the image processing apparatus according to the third embodiment of the present technology.

FIG. 23 is a timing chart illustrating an example of operation of the image processing apparatus according to the third embodiment. First input image data is input at timing T1, and then, the input interface 120 divides the image data and writes the divided image data into the odd number region before timing T2. Second input image data is input at timing T2, and then, the input interface 120 divides the image data and writes the divided image data into the even number region before timing T3.

During the period from the timing T2 to the timing T3, the scaler 200 reads the first divided input image data from the odd number region and reduces it. Moreover, along with this, the detector 160 performs object detection on the reduced image data during the period from the timing T2 to the timing T3.

The third image data is input at the timing T3, and then, the input interface 120 divides the image data and overwrites the divided image data on the odd number region.

After the timing T3, the scaler 200 reads the divided second input image data from the even number region and reduces it. Moreover, the detector 160 performs object detection on the reduced image data after the timing T3.

As described above, according to the third embodiment of the present technology, the frame memory 130 holds data of one frame in each of the odd number region and the even number region, enabling the image processing apparatus 100 to read data from one region while writing data into the other region. With this configuration, it is possible to enhance the throughput.

Note that the above-described embodiment illustrates an example for embodying the present technology, and the matter of the embodiments corresponds to the subject matter of the invention included in the appended claims. Similarly, the subject matter of the invention included in the appended claims corresponds to the matter under the same names as the matter in the embodiments of the present technology. The present technology, however, is not limited to the embodiments, and various modifications can be made to the embodiments without departing from the scope of the technology.

Moreover, the processing procedure in the above-described embodiments may be regarded as a method including these series of procedures, and as a program for causing a computer to execute these series of procedures or as a recording medium storing the program. This recording medium can be a compact disc (CD), a mini disc (MD), a digital versatile disc (DVD), a memory card, or a Blu-ray (registered trademark) disc, for example.

Note that effects described herein are non-restricting. The effects may be any effects described in the present disclosure.

Note that the present technology can also be configured as below.

(1) An image processing apparatus including:
a plurality of memories;
a writing unit that writes a predetermined number of pieces of pixel data arranged in a predetermined direction in image data in which the pixel data is arranged in a two-dimensional lattice pattern to be distributed over the plurality of memories;
a reading unit that reads the predetermined number of pieces of pixel data from the plurality of memories; and
a reduction unit that executes processing of smoothing in the predetermined direction onto the read pixel data.

(2) The image processing apparatus according to (1),
in which the reduction unit includes:
a smoothing processing unit that executes processing of smoothing in the predetermined direction onto the read pixel data and outputs a processing result; and
an interpolation unit that generates new pixel data as interpolation pixel data on the basis of the processing result.

(3) The image processing apparatus according to (2), further including:
a rectangular region holding unit that holds a rectangular region in which a predetermined number of pieces of the interpolation pixel data are arranged in a two-dimensional lattice pattern; and
a detector that detects a predetermined object in the rectangular region.

(4) The image processing apparatus according to (2) or (3), further including a write back processing unit that writes back reduced image data in which all the interpolation pixel data generated from the image data are arranged in a two-dimensional lattice pattern to be distributed over the plurality of memories,
in which the reading unit further reads the predetermined number of pieces of interpolation pixel data from the plurality of memories, and
the reduction unit further executes processing of smoothing in the predetermined direction onto the read interpolation pixel data.

(5) The image processing apparatus according to (1), further including a control unit that sequentially sets a plurality of reduction ratios and provides the reduction unit with an address of the interpolation pixel data to be output in the reduced image data corresponding to the set reduction ratio,
in which the reading unit reads the pixel data of the predetermined number of addresses corresponding to the provided address.

(6) The image processing apparatus according to any of (1) to (5),
in which two regions are provided in each of the plurality of memories,
the writing unit alternately executes processing of writing the pixel data into one of the two regions and processing of writing the pixel data into the other of the two regions, and
the reading unit alternately executes processing of reading the pixel data from the other region while the pixel data is written into the one region and processing of reading the pixel data from the one region while the pixel data is written into the other region.

(7) The image processing apparatus according to any of (1) to (6),
in which the reduction unit performs processing of smoothing in the predetermined direction and processing of smoothing in a direction perpendicular to the predetermined direction.

(8) The image processing apparatus according to claim 1,
in which the reading unit simultaneously reads the predetermined number of pieces of pixel data.

(9) An image processing method including:
a writing step of writing a predetermined number of pieces of pixel data arranged in a predetermined direction in image data in which the pixel data is arranged in a two-dimensional lattice pattern to be distributed over a plurality of memories;
a reading step of reading the predetermined number of pieces of pixel data from the plurality of memories; and
a reduction step of executing processing of smoothing in the predetermined direction onto the read pixel data.

(10) A program for causing a computer to execute:
a writing step of writing a predetermined number of pieces of pixel data arranged in a predetermined direction in image data in which the pixel data is arranged in a two-dimensional lattice pattern to be distributed over a plurality of memories;
a reading step of reading the predetermined number of pieces of pixel data from the plurality of memories; and
a reduction step of executing processing of smoothing in the predetermined direction onto the read pixel data.

REFERENCE SIGNS LIST

100 Image processing apparatus
110 Scaler control unit
120 Input interface
121, 192 Switching control unit
122 Selector
130 Frame memory
131, 132, 133, 134 Divided region memory
140, 141 Write control unit 150 Detection window memory
160 Detector
170 Detection result memory
180 Output interface
191, 193 Switch
200 Scaler
210 Reading unit
220 Horizontal direction reduction unit
221, 222 Horizontal direction low-pass filter
223 Horizontal direction linear interpolation unit
230 Vertical direction reduction unit
231, 232, 234 Register
233 Vertical direction low-pass filter
235 Vertical direction linear interpolation unit

The invention claimed is:

1. An image processing apparatus comprising:
a plurality of memories; and
a processor configured to execute program code stored in a non-transitory computer readable medium to perform operations comprising:
writing a predetermined number of pieces of pixel data arranged in a predetermined direction in image data in which the pixel data is arranged in a two-dimensional lattice pattern to be distributed over the plurality of memories;
reading the predetermined number of pieces of pixel data from the plurality of memories;
smoothing in the predetermined direction onto the read pixel data and outputting a processing result;
generating new pixel data as interpolation pixel data on the basis of the processing result;
holding a rectangular region in which a predetermined number of pieces of the interpolation pixel data are arranged in a two-dimensional lattice pattern; and
detecting a predetermined object in the rectangular region.

2. The image processing apparatus according to claim 1, further comprising a controller configured to sequentially set a plurality of reduction ratios and provide an address of the interpolation pixel data to be output in the reduced image data corresponding to the set reduction ratio,
wherein reading the predetermined number of pieces of pixel data comprises reading the pixel data of the predetermined number of addresses corresponding to the provided address.

3. The image processing apparatus according to claim 1, wherein two regions are provided in each of the plurality of memories, and wherein the operations further comprise:
alternately executing processing of writing the pixel data into one of the two regions and processing of writing the pixel data into the other of the two regions, and
alternately executing processing of reading the pixel data from the other region while the pixel data is written into the one region and processing of reading the pixel data from the one region while the pixel data is written into the other region.

4. The image processing apparatus according to claim 1, wherein the operations further comprise:
smoothing in the predetermined direction and processing of smoothing in a direction perpendicular to the predetermined direction.

5. The image processing apparatus according to claim 1, wherein the operations further comprise:
simultaneously reading the predetermined number of pieces of pixel data.

6. An image processing apparatus comprising:
a plurality of memories; and
a processor configured to execute program code stored in a non-transitory computer readable medium to perform operations comprising:
writing a predetermined number of pieces of pixel data arranged in a predetermined direction in image data in which the pixel data is arranged in a two-dimensional lattice pattern to be distributed over the plurality of memories;
reading the predetermined number of pieces of pixel data from the plurality of memories;
smoothing in the predetermined direction onto the read pixel data and outputting a processing result;
generating new pixel data as interpolation pixel data on the basis of the processing result;
writing back reduced image data in which all the interpolation pixel data generated from the image data are arranged in a two-dimensional lattice pattern to be distributed over the plurality of memories;
reading the predetermined number of pieces of interpolation pixel data from the plurality of memories; and
smoothing in the predetermined direction onto the read interpolation pixel data.

7. An image processing method comprising:
writing a predetermined number of pieces of pixel data arranged in a predetermined direction in image data in which the pixel data is arranged in a two-dimensional lattice pattern to be distributed over a plurality of memories;
reading the predetermined number of pieces of pixel data from the plurality of memories;
smoothing in the predetermined direction onto the read pixel data and outputting a processing result;
generating new pixel data as interpolation pixel data on the basis of the processing result;
holding a rectangular region in which a predetermined number of pieces of the interpolation pixel data are arranged in a two-dimensional lattice pattern; and
detecting a predetermined object in the rectangular region.

8. The image processing method according to claim 7, further comprising:
sequentially setting a plurality of reduction ratios and provides an address of the interpolation pixel data to be output in the reduced image data corresponding to the set reduction ratio; and
reading the pixel data of the predetermined number of addresses corresponding to the provided address.

9. The image processing method according to claim 7, wherein two regions are provided in each of the plurality of memories, and further comprising:
alternately executing processing of writing the pixel data into one of the two regions and processing of writing the pixel data into the other of the two regions, and
alternately executing processing of reading the pixel data from the other region while the pixel data is written into the one region and processing of reading the pixel data from the one region while the pixel data is written into the other region.

10. The image processing method according to claim 7, further comprising:
smoothing in the predetermined direction and processing of smoothing in a direction perpendicular to the predetermined direction.

11. The image processing method according to claim 7, further comprising:

simultaneously reading the predetermined number of pieces of pixel data.

12. A non-transitory computer readable medium storing program code, the program code being executable by a processor to perform operations comprising:

writing a predetermined number of pieces of pixel data arranged in a predetermined direction in image data in which the pixel data is arranged in a two-dimensional lattice pattern to be distributed over a plurality of memories;

reading the predetermined number of pieces of pixel data from the plurality of memories;

smoothing in the predetermined direction onto the read pixel data and outputting a processing result;

generating new pixel data as interpolation pixel data on the basis of the processing result;

holding a rectangular region in which a predetermined number of pieces of the interpolation pixel data are arranged in a two-dimensional lattice pattern; and detecting a predetermined object in the rectangular region.

13. The non-transitory computer readable medium according to claim 12, wherein the operations further comprise:

sequentially setting a plurality of reduction ratios and provides an address of the interpolation pixel data to be output in the reduced image data corresponding to the set reduction ratio; and reading the pixel data of the predetermined number of addresses corresponding to the provided address.

14. The non-transitory computer readable medium according to claim 12, wherein two regions are provided in each of the plurality of memories, and wherein the operations further comprise:

alternately executing processing of writing the pixel data into one of the two regions and processing of writing the pixel data into the other of the two regions, and alternately executing processing of reading the pixel data from the other region while the pixel data is written into the one region and processing of reading the pixel data from the one region while the pixel data is written into the other region.

15. The non-transitory computer readable medium according to claim 12, wherein the operations further comprise:

smoothing in the predetermined direction and processing of smoothing in a direction perpendicular to the predetermined direction.

16. The non-transitory computer readable medium according to claim 12, wherein the operations further comprise:

simultaneously reading the predetermined number of pieces of pixel data.

* * * * *